(12) United States Patent
Guo et al.

(10) Patent No.: US 7,774,599 B2
(45) Date of Patent: Aug. 10, 2010

(54) METHODOLOGIES TO SECURE INTER-PROCESS COMMUNICATION BASED ON TRUST

(75) Inventors: Jinhong Guo, West Windsor, NJ (US); Stephen L. Johnson, Erdenheim, PA (US); Il-Pyung Park, Princeton Junction, NJ (US); Lasse Bigum, Aalborg (DK); Henrik Davidsen, Aalborg (DK); Lars T. Mikkelsen, Aalborg (DK); Egon Pedersen, Aalborg (DK); Anders Ravn, Copenhagen (DK); Emmanuel Fleury, Bordeaux (FR)

(73) Assignee: Panasonic Corporation, Osaka (JP)

( * ) Notice: Subject to any disclaimer, the term of this patent is extended or adjusted under 35 U.S.C. 154(b) by 999 days.

(21) Appl. No.: 11/532,159

(22) Filed: Sep. 15, 2006

(65) Prior Publication Data
US 2008/0126800 A1 May 29, 2008

(51) Int. Cl.
*H04L 29/06* (2006.01)
(52) U.S. Cl. .................................. 713/164; 713/167
(58) Field of Classification Search .............. 713/164, 713/167
See application file for complete search history.

(56) References Cited

U.S. PATENT DOCUMENTS

| | | | |
|---|---|---|---|
| 5,652,885 A * | 7/1997 | Reed et al. ..................... 713/1 |
| 5,787,300 A * | 7/1998 | Wijaya ........................... 712/1 |
| 2003/0196094 A1* | 10/2003 | Hillis et al. .................... 713/179 |
| 2004/0226023 A1 | 11/2004 | Tucker | |
| 2004/0268363 A1 | 12/2004 | Nace et al. | |
| 2005/0138387 A1* | 6/2005 | Lam et al. ...................... 713/185 |
| 2005/0182966 A1* | 8/2005 | Pham et al. ..................... 713/201 |
| 2006/0005161 A1* | 1/2006 | Atkin et al. .................... 717/106 |
| 2008/0126800 A1* | 5/2008 | Guo et al. ....................... 713/167 |

OTHER PUBLICATIONS

"Stackable Security Modules." Lwn.net. Posted by corbet on Nov. 10, 2004. Accessed on Oct. 19, 2009. http://lwn.net/Articles/110432/.*

* cited by examiner

*Primary Examiner*—Kambiz Zand
*Assistant Examiner*—Jason K Gee
(74) *Attorney, Agent, or Firm*—Harness, Dickey & Pierce, P.L.C.

(57) ABSTRACT

A system securing inter-process communication (IPC) based on trust includes a user quota mechanism to provide resource management of IPC's. A single user is allowed to allocate a fixed amount of objects less than a system maximum. A trusted IPC mechanism mediates access to IPC objects by employing signed executables signed by a key and containing a list of trusted keys. A trust relationship is used among a set of subjects connected to an IPC to determine whether communication can be carried out between processes. In order for the processes to communicate via an IPC, either they have to trust each other, or a kernel must trust one process and that process must also trust the other process.

9 Claims, 11 Drawing Sheets

METHODOLOGIES TO SECURE INTER-PROCESS COMMUNICATION BASED ON TRUST

FIELD

The present disclosure generally relates to inter-process communication, and relates in particular to securing of inter-process communication based on trust.

BACKGROUND

The statements in this section merely provide background information related to the present disclosure and may not constitute prior art.

Inter-Process Communication (IPC) is used by processes to communicate with each other while running on the same computer. It is an important part in the operating system as synchronizing and data exchange occurs frequently throughout the system operation. However, without protection, as in conventional operating systems, IPC can be used for attacks. Typical examples include sending malicious payload to a privileged process or overloading the IPC to cause denial of service attacks. System V IPC objects includes message queue, semaphore set and share memory segment. These objects are identified by a unique identifier. To access an IPC object, this ID is the only thing needed. Even though a key is needed to obtain the ID, there are scenarios in which other processes can connect to the IPC object without the key. Standard Discretionary Access control (DAC) can be enforced on the IPC objects. However, DAC does not provide sufficient protection. In summary, secure IPC is needed within the OS.

Before launching into discussion of the present teachings, one security mechanism in particular deserves some discussion. Umbrella is a security mechanism for Linux implementing Process-Based Access Control (PBAC). The PBAC scheme moves the responsibility of restricting capabilities of programs from the system administrators to the developers. The reasoning behind this, is that the developers have a deeper knowledge on which restrictions are necessary for their own software. A restriction on a subject, means that it have access to all objects except those objects which is in the restriction list. In difference to other security schemes, PBAC only defines one global security policy.

Global Policy 1. Given that $p_1$ and $p_2$ are nodes in the process tree P and $p_1$ has the restriction set $r_1$ and $p_2$ has the restriction set $r_2$. $r_1$ and $r_2$ being subsets of R which is the set of all possible restrictions. If $p_1$ is a descendant of $p_2$ then $r_1$ is a superset of $r_2$.

This policy ensures that processes are at least as restricted as their parent, regardless of their ownership. Thereby restrictions respect the partial order in the process tree. Umbrella extends this policy by providing a restricted fork system call and signed binaries. The restricted fork system call allows the software developer to apply further restrictions on child processes. The signed binaries enables the developer to embed restrictions in the binary of a program. Furthermore, the signed binaries allows the system administrator to verify the origin and integrity of a program, and to apply restrictions accordingly.

Currently Umbrella only includes restrictions for a limited set of IPC methods, i.e. files, signals, sockets, and named pipes. It is not possible to restrict programs from using the System V IPC methods, that is shared memory, semaphores, and message queues, using Umbrella. As the following example shows, this limitation has some problems, and in the worst case it will actually enable programs to circumvent the restrictions enforced by Umbrella.

Assume, for example, that an e-mail client is using a System V IPC method to communicate with the address book. Whether message queues or shared memory is used is not that important, however, assume that message queues are used in this example. Also, assume the e-mail client and the address book are running as the same user, then the least possible standard Unix permissions for the IPC will be 0600. The attachment is still restricted from using the network and from accessing /boot, /etc, and ~/.abook on the local file system. However, since the attachment is running as the same user as both the e-mail client and the address book, and no restrictions are enforced on message queues by Umbrella, it will have read/write permissions on the IPC.

The aforementioned permissions enable the attachment to mount at least four attacks: (1) eavesdropping: the attachment will be able to read all, or at least a large part of, the messages exchanged between the e-mail client and the address book; hence, the attachment will be able to see data it was not supposed to (remember the attachment was restricted from ~/.abook.); (2) substitution: the attachment will be able to alter messages exchanged between the e-mail client and the address book; (3) denial of service: the attachment will be able to exchange all messages with empty messages, and thus, effectively creating a Denial of Service attack; and (4) stack smashing: assuming either the e-mail client or the address book has a stack smashing vulnerability, the attachment will be able to execute arbitrary code with the privileges of the e-mail client or the address book, respectively; in this case it allows the attachment to escalate its privileges and circumvent the Umbrella restrictions on the network and ~/.abook; however, it will still not be able to access /boot nor /etc.

It should be readily understood that the eavesdropping, substitution, and Denial of Service attacks are very similar, and they are in fact all man-in-the-middle attacks.

SUMMARY

A system securing inter-process communication (IPC) based on trust includes a user quota mechanism to provide resource management of IPC's. A single user is allowed to allocate a fixed amount of objects less than a system maximum. A trusted IPC mechanism mediates access to IPC objects by employing signed executables signed by a key and containing a list of trusted keys. A trust relationship is used among a set of subjects connected to an IPC to determine whether communication can be carried out between processes. In order for the processes to communicate via an IPC, either they have to trust each other, or a kernel must trust one process and that process must also trust the other process.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
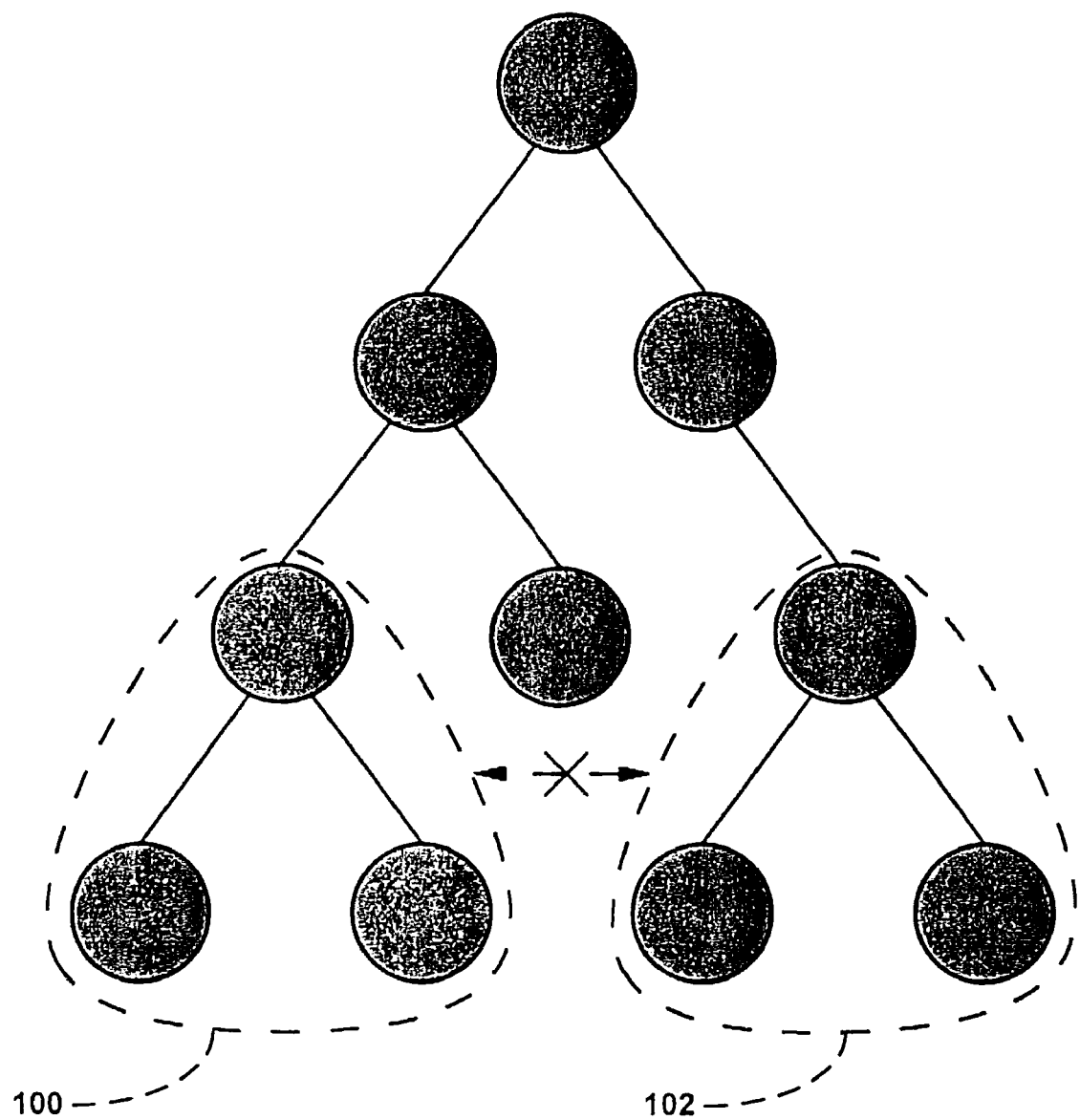
FIG. 1 is a process tree illustrating an overview of domain separation.

The following description is merely exemplary in nature and is not intended to limit the present disclosure, application, or uses.

The problems associated with the lack of secure IPC in standard operating systems can be summarized into two categories: lack of resource management and lack of access control on accessing IPC object. The first problem can cause Denial of Service (DoS) attacks while the other makes it possible for malicious processes to send malicious payloads to privileged processes. By sending the malicious payload, the process can potentially cause buffer overflow and escalate its permission to cause damage to the system.

To address these problems, a quota mechanism is first used to provide resource management of IPC's. This prevents a single subject from exhausting the resource pool. A single user is allowed to allocate a fixed amount of objects within the system maximum, but not reaching the maximum.

In addition, we propose a trusted IPC mechanism to mediate access to the IPC objects. Trusted IPC is based on signed executables which are signed by a key and contain a list of trusted keys. The trust relationship among the set of subjects that connected to an IPC determines if the communication can be carried out. In order for the processes to communicate via an IPC, either they have to trust each other, or the kernel must trust one process and that process must also trust the other process.

As discussed above, IPC security is a relatively unexplored area in computer security. However, IPC can be used as a means to attack the system by sending malicious payload to a privileged process or using DoS attacks. Using the solution proposed above, such vulnerabilities in the system can be remedied. The solution provides a resource management scheme as well as a fine-grained access control on system V IPC. The disclosed secure IPC scheme can also be used with some other Mandatory Access Control (MAC) scheme to provided additional security to the operating systems. Some embodiments can be implemented as a Linux Security Module for the Linux kernel. By doing so, no modification on the kernel source is needed. The design also causes minimal overhead.

One technique that can be employed in some embodiments is a use of a quota mechanism. For example, to prevent a single subject from depleting the resource pool of shared memory segments and thus preventing other subjects from creating shared memory segments, a quota mechanism can be used. In this case, a subject should only be allowed to create a predefined number of shared memory segments. This number must be smaller than the system wide number of shared memory segments, as defined by SHMMNI.

Regarding a subject's Quota, in current kernels, each user has a memory dependent, system wide, number of subjects which he is allowed to start, RLIMIT_NPROC. This system wide restriction only depends on the amount of memory installed. Each subject also has a maximum number of allowed shared memory segment, SHMSEG. This restriction is, however, not implemented in current kernels.

One might think that a quota mechanism should be based on RLIMIT_NPROC and SHMSEG, so that the following should hold:

$$SHMSEG \times \text{RLIMIT\_NPROC} < SHMMNI \quad (1)$$

But this mechanism yields a problem in that a subject is able to create a shared memory segment and terminate without deleting the shared memory segment again. Therefore, the shared memory segment would still be in the system even though the subject is no longer alive. This result makes it possible for a malicious user to create as many shared memory segments on the system as the system wide limit defines. So Equation 1 cannot be used for implementing a safe quota mechanism. Instead, a limit per user should be used.

In some embodiments, an alternative to subject quota is user quota as illustrated in Equation 2. USER_SHM_MAX denotes the total number of shared memory segments a user is allowed to create.

$$\text{USER\_SHM\_MAX} < SHMMNI \quad (2)$$

With Equation 2, we are sure that a single active user cannot carry out a DoS attack on the system by creating all shared memory segments.

The quota mechanism is not a solution to all the problems described above. The reason it is only a partial solution is that non-malicious users could, through normal use, end up having used some of the system wide number of shared memory segments, and a malicious user or subject can, while still abiding the restriction mentioned earlier, take up the rest of the shared memory segments, preventing the other users from allocating any further shared memory segments.

To avoid this problem, we consider a solution which is shown in Equation 3. In this solution, the amount of shared memory segments each user can get, USER_SHM_MAX, depends on the total number of users in the system, #users. The drawback of this solution is, on systems with many users, each user will not get enough shared memory segments for the system to be usable. Therefore, the system administrator has to raise the total amount of shared memory segments SHMMNI as the number of users grows.

$$\text{USER\_SHM\_MAX} = \frac{SHMMNI}{\#\text{users}} \qquad (3)$$

With Equation 3 the system administrator could also set #users to a number below the system wide number of users. This limitation implies that each user gets a fixed number of shared memory segments. Thus, the system administrator should not worry about users getting to few shared memory segments. However, this introduces a possibility to DoS the system.

It is also possible that each user in the system will get his own limit of shared memory segments, but this will put a lot of work on the system administrator. The reason for this is that the system administrator needs to know what applications each user uses and how many shared memory segments these applications uses.

While the description of quotas centered around shared memory segments, it can also be possible to implement this solution component for semaphores and message queues as well. The only application we found to crash when depleting the pool of available semaphores was ALSA, while we could find no applications that have problems caused by depleting the available resources of message queues. Furthermore, a quota mechanism is orthogonal to the existing security and access control mechanisms available, and they can be used in conjunction with the proposed quota mechanism.

Resource scheduling algorithms are another way implementing quotas. In these algorithms, a user may have to wait on objects being released by another user, before they are able to require the object. It should be noted, however, that it is not currently feasible to use resource scheduling algorithms on a modern platform. Users have expectations of responsive systems, and resource scheduling algorithms are most convenient on batch systems. Furthermore, resource scheduling makes it possible for a malicious user to carry out a DoS attack on the system by never releasing the objects which he has required.

To sum up, subject quota is not feasible at all as one user can carry out a DoS attack against the system. Therefore, a user quota can be employed such as a user quota from one of three categories: (1) a single user is able to allocate a number of objects below the system maximum but never allowed to allocate all objects, as shown in Equation 2; (2) a single user is able to create a fixed amount of objects as shown in Equation 3; or (3) a resource scheduling algorithm.

Turning now to FIG. 1, we now begin discussion of another solution component, domain separation. Conceptually, domain separation is about classifying subjects into domains 100 and 102 and preventing a subject, which is misbehaving in domain 100, from affecting subjects in the other domain 102. The idea of domain separation is related to access control.

Access control can be described as the set of permissions a subject has on an object. A subject is an active entity and, in Unix, it is always a process. An object is a passive entity which typically is a file, IPC, etc. We define S to be the finite set of subjects in a system and O to be the finite set of objects. We denote the finite set of permissions by R. In general terms access control can be described with an access control matrix as in FIG. 3.1. The entries in the matrix describes what permissions each subject has for each object. In Unix, as an example, these permissions can be read, write or execute.

Read is permission for reading the contents of an object, write is permission to alter an object, and the execute permission is used to indicate whether or not a subject may execute methods of the object.

In the access control matrix model, the state of the system is defined by a triple, (S, O, A), where A is the access control matrix, where $A: S \times O \rightarrow P(R)$ Thus A(s,o) specifies the set of permissions that a subject s has on an object o.

Even in small systems if the matrix in Table 1 becomes very large, it will require in the order of $|S| \cdot |O| \cdot |R|$ bits to be represented. So for practical reasons, including performance, this matrix is not used directly for access control. What we need is a trade off between performance and the level of granularity in which we wish to represent the access control matrix.

TABLE 1

| | Access Control Matrix | | | | |
|---|---|---|---|---|---|
| | Object 1 | Object 2 | Object 3 | | Object N |
| Subject 1 | rwx | r-- | --- | ... | --- |
| Subject 2 | r--- | r-x | --- | ... | rw- |
| Subject 3 | --- | rwx | --- | ... | rw- |
| ... | ... | ... | ... | ... | ... |
| Subject N | --- | --- | rw- | ... | --- |

To reduce the size of this matrix, the subjects can be grouped into a finite set of domains. In Unix, there are two standard set of domains: users, $D_{users}$, and groups, $D_{groups}$. Furthermore, there exists a special set with a domain containing all subjects. This domain is called the others domain, that is $D_{others} = \{d_{others}\}$, where $d_{others} = S$. All subjects, started by the user u, are executed in the domain of the user $d_u \in D_{users}$. The user domains are mutually disjoint and classify the subjects, thus $d_u \cap d_{u'} \neq \phi \Rightarrow u = u'$ and $\cup_{d \in D_{users}} d = S$. Furthermore, the subject can be in an arbitrary number of group domains (corresponding to the groups of the user starting the subject). Thus, these domains does not have to be disjoint.

We define the function $$\text{userDomain}: S \rightarrow D_{users}$$

as the function that returns userDomain(s)=d where $d \in D_{users} \hat{} s \in d$, and the function $$\text{groupDomains}: S \rightarrow P(D_{groups})$$

as the function that returns groupDomains(s)= $\{d | d \in D_{groups} \hat{} s \in d\}$.

Figure 2:
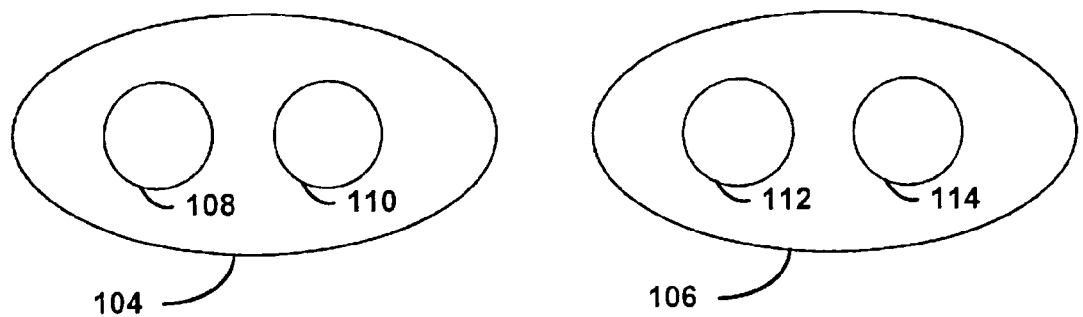
FIG. 2 is a network diagram illustrating two domains each having multiple subjects.

Tuning next to FIG. 2, two domains 104 and 106 can each have multiple subjects 108, 110, 112, and 114. The criteria for what subjects goes into what domains can be arbitrary, but it is important, as one of the key difficulties with domain separation is how to decide this. Subjects in the same domain are allowed to communicate via IPC, while communication via IPC between different domains can either be allowed or not, on a domain to domain basis. However, again it is the process of deciding with what domains this should be allowed, which is the non-trivial part.

In some embodiments, an administrator domain separation scheme is used as a solution component. As an example of how to use domain separation to ensure secure IPC, we propose a scheme which allows the system administrator to classify subjects into a range of domains, and objects into two types, trusted and untrusted.

Regarding domains, each domain D consists of an arbitrary number of subjects S. Which subjects belongs to which domains are controlled by the system administrator. Furthermore each subject is only allowed to be in one domain at a time. An example of such domains 104 and 106 is shown in FIG. 2.

Figure 3:
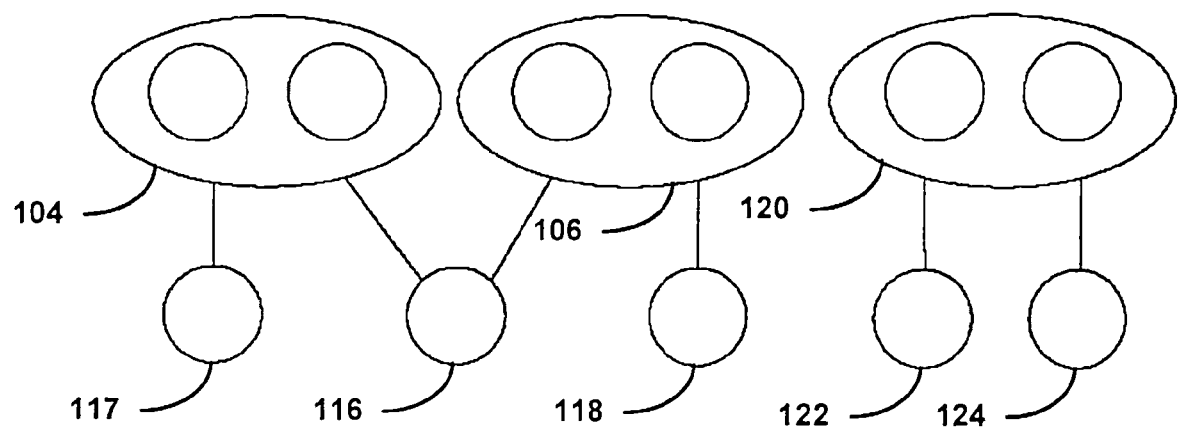
FIG. 3 is a network diagram illustrating domains able to communicate because of a trusted object that they share, and domains not able to communicate because they share no trusted objects.

Regarding trusted and untrusted objects, the system administrator labels the objects in the system as either trusted or untrusted; the default should be untrusted. Referring to FIG. 3, if an object 116 is trusted, it can be shared between many domains, such as domains 104 and 106. If an object 118 is untrusted, only one domain 106 is allowed to use the object. The only objects that the system administrator should mark as trusted are the ones which he believes are able to ensure secure IPC. Domain 104 and 106 share a single trusted object 116 and are therefore able to communicate. In contrast, domain 120 only has two untrusted objects 122 and 124, and is therefore unable to communicate with domains 104 and 106, which also have untrusted objects 117 and 118, respectively.

TABLE 2

Relationship between domains and types

| Domains | Types | | | | |
|---|---|---|---|---|---|
| | Trusted Object 116 | Untrusted Object 117 | Untrusted Object 118 | Untrusted Object 122 | Untrusted Object 124 |
| Domain 104 | x | x | | | |
| Domain 106 | x | | x | | |
| Domain 120 | | | | x | x |

Administrator domain separation offers a fine granularity. However, it relies heavily on how well the system administrator makes the domains and what objects are marked as trusted and untrusted. Furthermore, he has to choose which domains the objects should be used with, as shown in Table 2. Therefore, the burden placed on the system administrator is too large for this solution to work securely on some computer systems. Accordingly, some embodiments at least in part automatically classify domains and objects.

An additional or alternative approach to securing IPC in some embodiments can be to verify that executables are signed with a vendor key. A vendor key is an certificate that uniquely identifies the software vendor that created the executable, and which is chosen by the vendor typically such that it is in practice unforgeable. Upon execution, the vendor key is linked with the resulting subject, so the vendor key can always be found. Using this mechanism, we have identified four different strategies that can be used, which we describe next.

Figure 4:
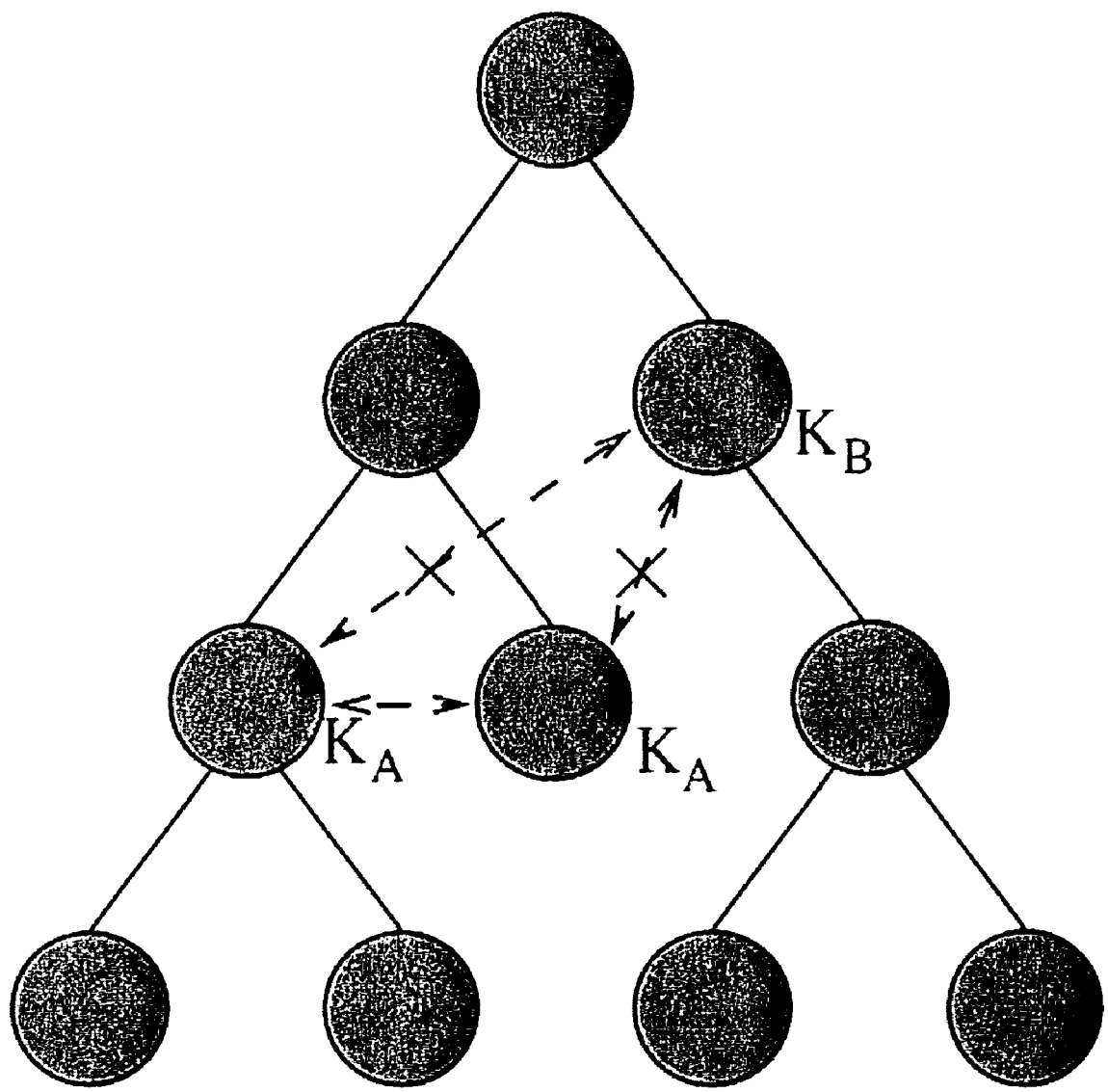
FIG. 4 is a network diagram illustrating a first kernel trust example in which the kernel trusts keys $K_A$ and $K_B$, but only subjects signed with the same vendor key are able to communicate.

Turning to FIG. 4, in an example, consider that the kernel trusts keys $K_A$ and $K_B$, but only subjects signed with the same vendor key are able to communicate. This kernel trust solution component lets the kernel trust vendor keys, e.g. the kernel must specify which keys should be trusted. This implicitly means that vendor keys that the kernel does not trust, are untrusted. Whether executables, which are not signed at all, should be allowed to run, is something that should be discussed.

Figure 5:
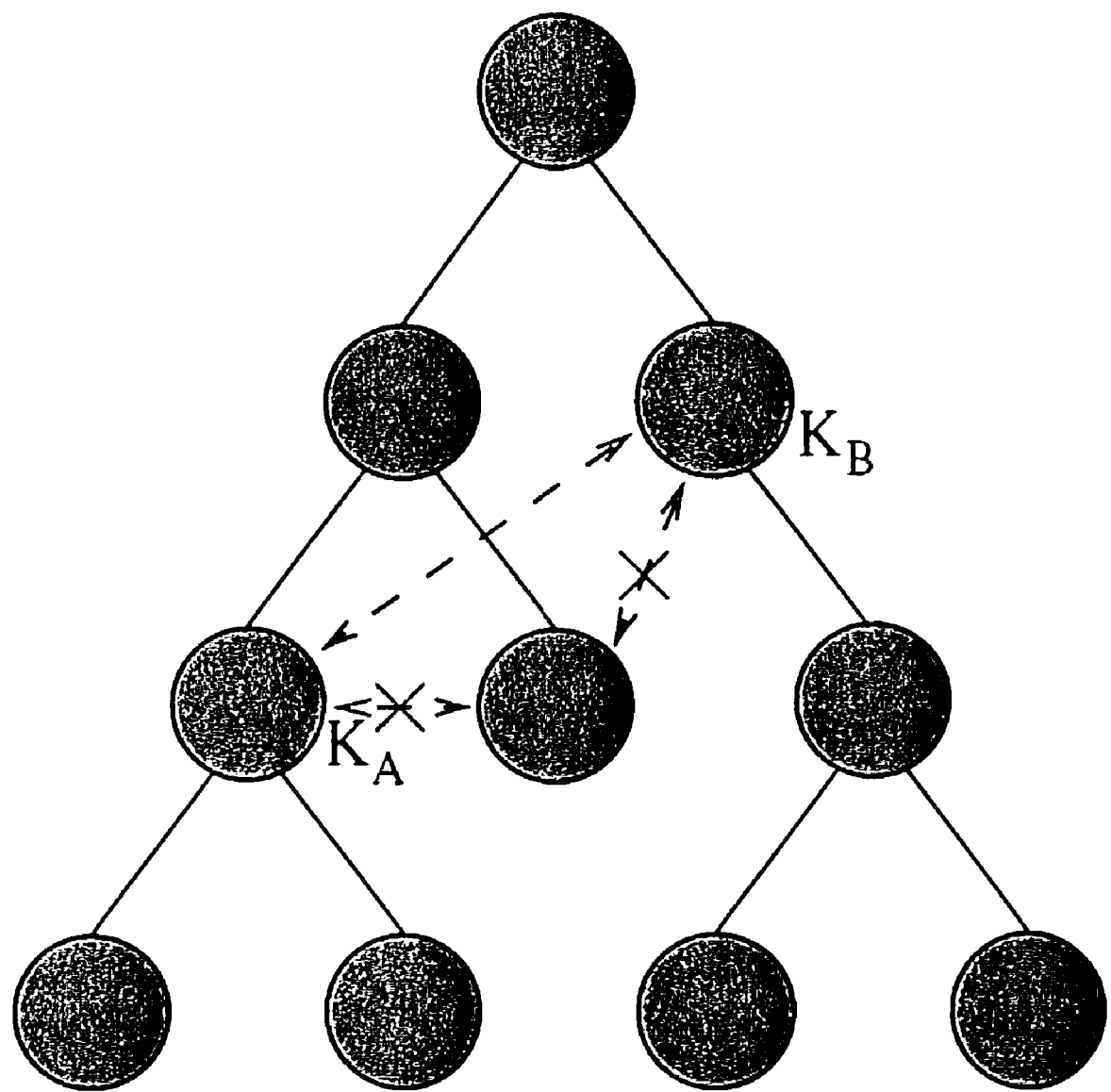
FIG. 5 is a network diagram illustrating a second kernel trust example in which the kernel trusts keys $K_A$ and $K_B$, and all subjects signed with these trusted vendor keys are able to communicate.

With the kernel trusting specific vendor keys, there are two solutions that can be used. One possible solution is to only allow subjects signed with the same vendor key to communicate with each other, as shown in FIG. 4. Turning to FIG. 5, an alternative or additional solution component is to let all subjects, signed with vendor keys trusted by the kernel, communicate with each other. In particular, the kernel trusts keys $K_A$ and $K_B$, and all subjects signed with these trusted vendor keys are able to communicate. Meanwhile, untrusted subjects, i.e. those not signed with a vendor key, or just not signed with a vendor key trusted by the kernel, are allowed to communicate with one another, but not with trusted subjects.

Figure 6:
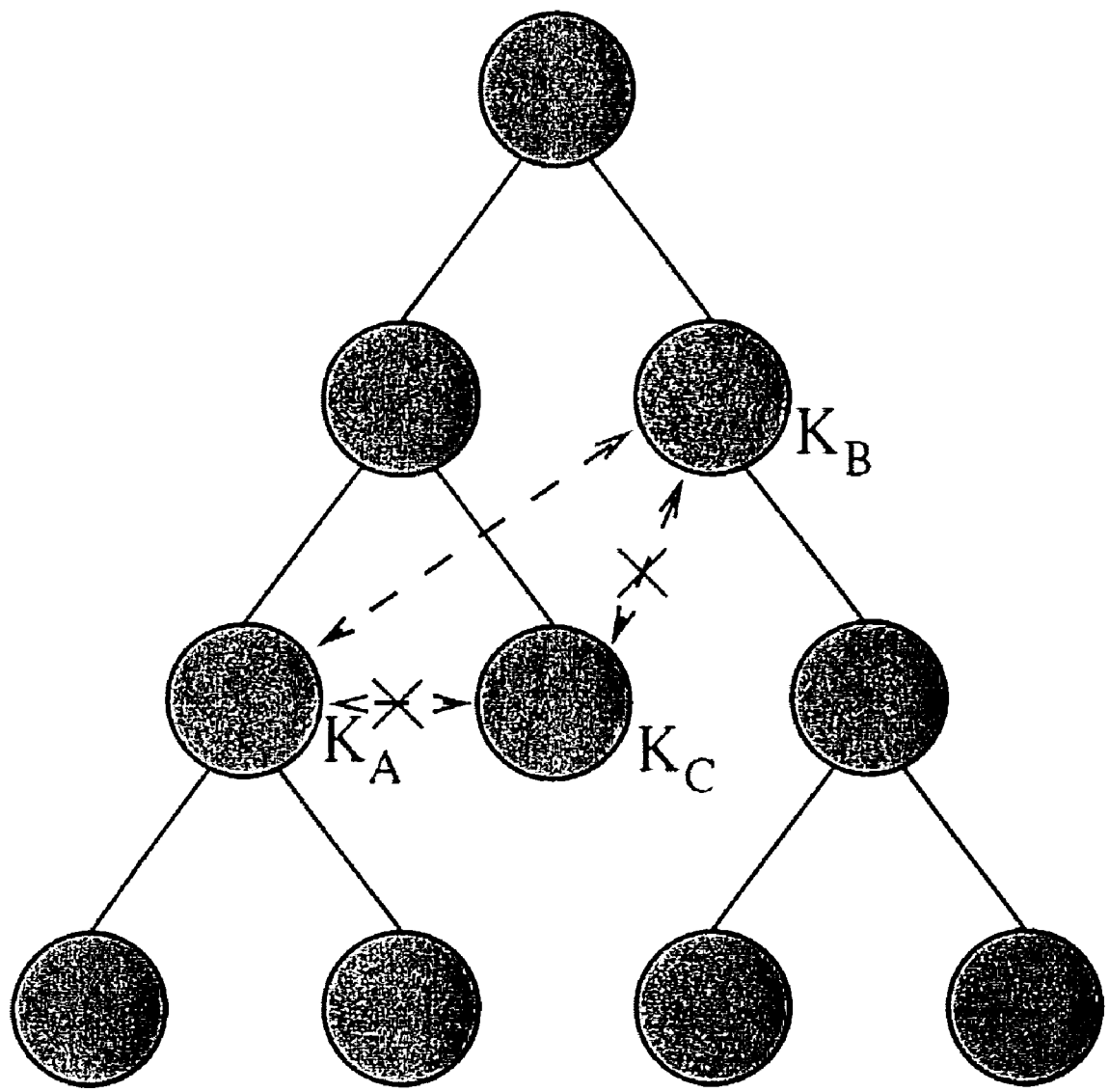
FIG. 6 is a network diagram illustrating vendor trust in which the vendors of keys $K_A$ and $K_B$ mutually trust each others' keys.

Turning now to FIG. 6, yet another additional or alternative solution component, involving signed executables, is to let each vendor specify which vendor keys they trust, and only if one vendor of keys $K_A$ trusts the keys $K_B$ of another vendor, subjects signed with the key $K_A$ are allowed to receive messages from subjects signed with the key $K_B$, but not with a subject signed with a key $K_C$ of an untrusted vendor.

Figure 7:
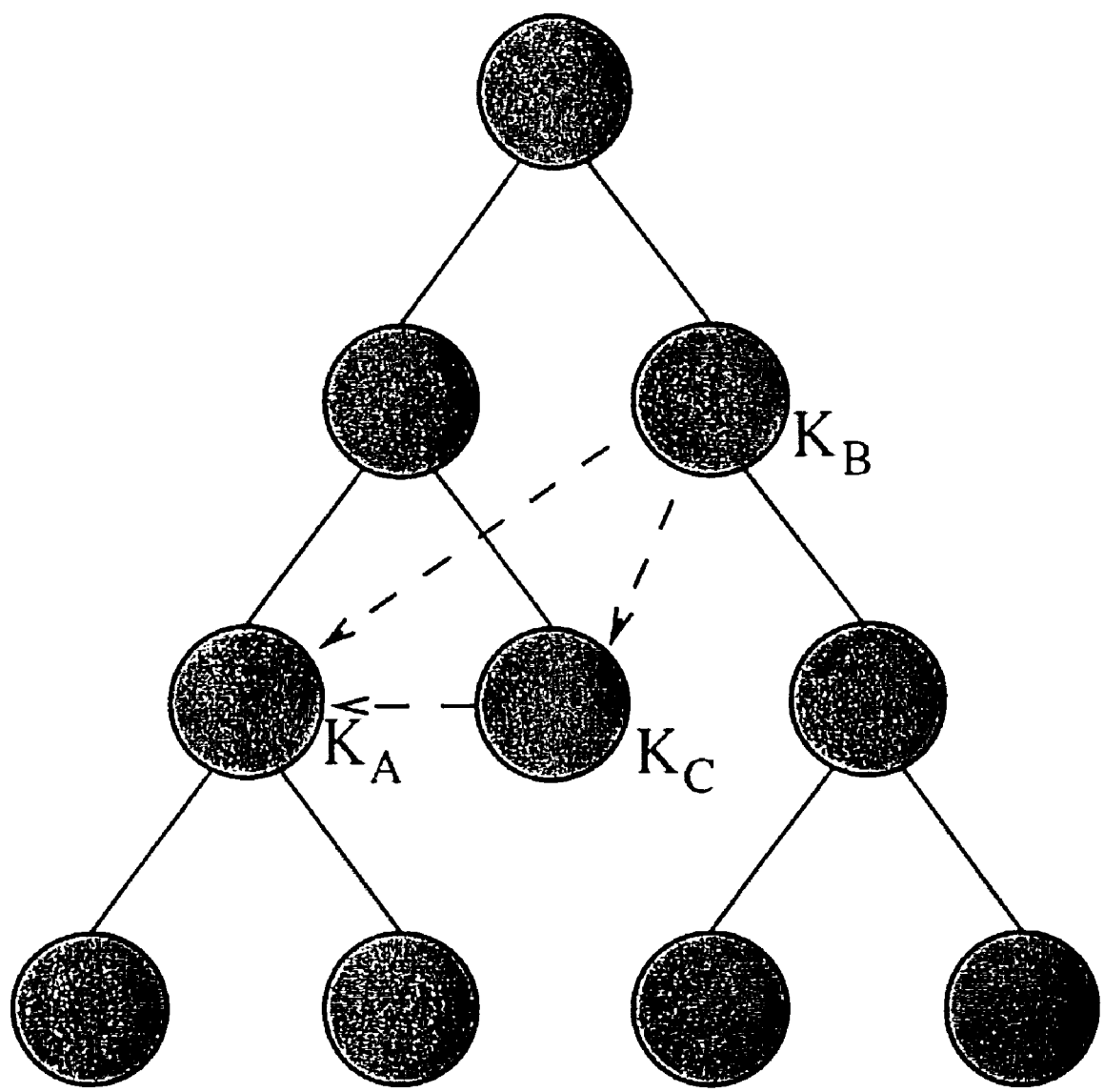
FIG. 7 is a network diagram illustrating a web of trust in which a vendor of key $K_A$ trusts the vendor of key $K_C$, and the vendor of key $K_C$ trusts the vendor of key $K_B$.

Turning next to FIG. 7, still another additional or alternative solution component involves a web of trust. This solution component uses a transitive rule stating that if the vendor of key $K_A$ trusts vendor key $K_B$, and the vendor of key $K_B$ trusts vendor key $K_C$ then the vendor of key $K_A$ also trusts $K_C$. Only if a vendor of key $K_A$ trusts the key $K_B$ of another vendor, are subjects signed with the key $K_A$ allowed to receive messages from subjects signed with the key $K_B$.

By having the vendors decide whether or not the keys of other vendors should be trusted, the system administrator does not have to specify the relation between subjects and objects. Regular DAC takes care of basic access control as usual, with the extra access control in place that signing executables with vendor keys represents. Thus, if a vendor knows that his software depends on another vendor's software, this can be specified and will continue to work. This implies that he trusts the other vendor's software. A drawback, with all other solutions than the one where the kernel must trust the vendor keys, the system administrator cannot prevent subjects, signed with vendor keys that trust each other, from communicating together, if they want to.

Another solution component in some embodiments involves extending Umbrella restrictions. As discussed above, Umbrella uses PBAC for access control as a supplemental to DAC. This approach can also be taken when a solution to securing IPC needs to be found.

Like the Umbrella design, Umbrella extension requires that the programmers (or vendors) of the various software programs specify execute restrictions, i.e NFSR restrictions. The software vendor embeds these restrictions in a signature which is used to sign the binary.

Like with the original Umbrella layout, non-signed or non-trusted signed binaries can be sandboxed, in this case meaning they will get no access to IPC. By using the 32-bit restriction vector already present in Umbrella, this is a simple extension of the Umbrella access control scheme. As there are 3 System V IPC mechanisms, one could use a bit for each kind, or even make it even more fine grained, with a per IPC-channel flag, possibly combined with read/write access to these. Various embodiments can therefore have varying implementations as the access control can be made arbitrarily fine-grained.

This extended bitvector can restrict IPC access for a process, in the same way a process can restrict the children it forks, so that they are further restricted than it was. A useful scenario for this restriction process can be a mail client that is not restricted from IPC access, while opened attachments should be.

Summing up our discussion of applications using System V IPC, two categories of flaws with System V IPC were identified. Having discussed a number of possible solutions, we can now identify what solution components can be applied to each of the flaws. For example, no resource management per user or process can be addressed by the user quota mechanism. Also, low granularity of permissions can be addressed by domain separation, signed executables with vendor keys, and extending Umbrella restrictions.

Before going into the details of a particular design for implementing the above solutions, we first discuss some high-level considerations.

It is unfeasible to use any of the solutions outlined above to solve both problems, as they are quite different in nature. Instead, we choose to split the design into two parts, each focusing only on one of the problems.

For the problem of no resource management per user or subject, we found only one viable mechanism that could solve this, user quota. We outlined a number of strategies that could be used with this mechanism, and choose one in particular for this particular design. For the problem of low granularity of permissions, we found there to be several mechanisms that could be used. Likewise, we choose a particular solution component in view of its merits for this particular design.

Furthermore, using the design should, in some embodiments, require minimal work by the users. That is, software vendors are not expected to modify the source code of their software, however, they still have the primary responsibility for using the security mechanism. In addition to this, the system administrators are expected to do minimal work.

Before digging into the design itself, it is necessary to outline the assumptions on which the design is based. The design builds on top of these assumptions, thus leaving them out would have the design look incomplete or missing in some areas.

One type of assumption that we can make for some embodiments, is that root must be trusted. The root user has tremendous power over and capabilities on a system. Thus, most attempts to secure parts of the system against the root user will most likely fail. The root user can modify many parts of the system, including: (1) modify files on disk; (2) modify the memory; (3) modify the kernel; and (4) load and unload modules.

While root can be restricted from modifying files in certain areas of the disk, for instance with the help of Umbrella, root can merely access the raw device in/dev. Root can also modify the memory directly, for instance by loading modules that access and modifies the memory. Likewise, root can also modify the kernel and change its behaviour, so security mechanisms can be circumvented, and the behaviour of the kernel can be changed.

A way to prevent some of these attacks can be to load a module preventing the loading and unloading of modules. However, one needs to be root to load modules, and root can reboot the machine and thus circumvent it in this way. The above synopsis explains why root might need to be trusted when the Secure IPC module is used by itself. However, if another security mechanism is used to properly restrict the root user, this assumption is not needed. Such a mechanism will probably require dedicated hardware support.

Buffer overflow vulnerabilities present a serious threat to any system, and as can be seen from any vulnerability list, they are inevitable. The solution components discussed above are not aimed at preventing buffer overflow attacks.

Before describing the properties of our module, we need to describe the properties of the system security mechanism for System V IPC. We name the system properties for the operations create( ), destroy ( ), send ( ), receive( ), wait ( ), signal ( ), attach ( ), and detach ( ). To describe these functions, we need to introduce two helper functions first. We define owner: $O \rightarrow S \cup \{FREE\}$, as the function that returns the owner of the object o. Note that since IPC objects may exist without an owner subject, owner returns FREE for such objects. We define attached: $O \rightarrow N_0$ as the function that returns the number of subjects attached to an IPC object. Last, to return the amount of used space in bytes, we define size: $O \rightarrow N_0$ as the function that, given an object, or a set of objects, returns an integer count of the bytes used by the IPC object or objects.

Using our newly defined helper functions, we define the system properties that hold for functions, we define the system properties that hold for functions relating to message queues, semaphore sets, and shared memory segments respectively.

However, when defining the system properties, we need to emphasize the distinction between message queues, and the messages that they can hold. Similarly, we also need to emphasize the distinction between semaphore sets and semaphores that they can hold. Finally, for shared memory segments we need to make it clear that multiple subjects can have several mappings each of a shared memory segment.

Let $O_{mq}$, $O_{sma}$, and $O_{shm}$ be mutually disjoint subsets of O that define the sets of message queue objects, semaphore set objects, and shared memory objects respectively.

We now define $O_{msg}$ as the set of messages. The message queues are mutually disjoint and classify the messages, thus $o_{mq} \cap o'_{mq} \neq \phi \Rightarrow o_{mq} = o'_{mq}$ and $\cup_{o_{mq} \in O_{mq}} o_{mq} = O_{msg}$.

We define $O_{sem}$ as the set of semaphores. The semaphore sets are mutually disjoint and classify the semaphores, thus $o_{sma} \cap o'_{sma} \neq \phi \Rightarrow o_{sma} = o'_{sma}$ and $\cup_{o_{sma} \in O_{sma}} o_{sma} = O_{sem}$.

Three system constants help to control the sizes of message queues. MSGMNI defines the system wide maximum number of message queues that can be allocated. MSGMAX defines the system wide maximum size, in byte, for individual messages, while MSGMNB defines the maximum combined size, also in bytes, of all messages that can be queued simultaneously in a message queue.

---

Property 1 (Message Queue create( )).
precondition($O_{mq}$)
$\quad |O_{mq}| < $ MSGMNI
postcondition($s',o'_{mq},O_{mq},O'_{mq}$)
$\quad |O_{mq}|=|O_{mq}|+1$
$\quad \wedge o'_{mq} = \Diamond$
$\quad \wedge o'_{mq} \in O'_{mq}$
$\quad \wedge o'_{mq} \notin O_{mq}$
$\quad \wedge $ owner($o'_{mq}$)=s
Property 2 (Message Queue send( )).
precondition($s,o_{mq},o_{msg}$)
$\quad $ WRITE $\in $ perms($s,o_{mq}$)
$\quad \wedge $ size($o_{msg}$) $\leq $ MSGMAX
$\quad \wedge \Sigma_{o'_{msg} \in o_{mq}}$ size($o'_{msg}$)+size($o_{msg}$) $\leq $ MSGMNB
postcondition($o_{msg},o_{mq},o'_{mq},O_{msg},O'_{msg}$)
$\quad o'_{mq} = o_{mq} - \langle o_{msg} \rangle$
$\quad \wedge o_{msg} \notin o_{mq}$
$\quad \wedge o_{msg} \in O'_{msg}$
$\quad \wedge o_{msg} \notin O_{msg}$
Property 3 (Message Queue receive( )).
precondition($s,o_{mq}$)
$\quad $ READ $\in $ perms($s,o_{mq}$)
postcondition($o_{msg},o_{mq},o'_{mq},O_{msg},O'_{msg}$)
$\quad o_{mq} = \langle o_{msg} \rangle \cdot o'_{mq}$
$\quad \wedge o_{msg} \notin o'_{mq}$
$\quad \wedge o_{msg} \notin O'_{msg}$
Property 4 (Message Queue destroy( )).
precondition($s,o_{mq}$)
$\quad $ WRITE $\in $ perms($s,o_{mq}$)
$\quad \vee $ owner($o_{mq}$)=s
postcondition($o_{mq},O_{mq},O'_{mq},O_{msg},O'_{msg}$)
$\quad |O'_{mq}|=|O_{mq}|-1$
$\quad \wedge |O'_{msg}|=|O_{msg}|-|o_{mq}|$
$\quad \wedge O'_{msg} = O_{msg} \setminus o_{mq}$
$\quad \wedge o_{mq} \in O_{mq}$
$\quad \wedge o_{mq} \notin O'_{mq}$

---

As with message queues, semaphores sets has system constants that helps control them. SEMNI defines the system wide maximum number of semaphore sets that can be allocated. SEMVMX defines the maximum value that any semaphore in a semaphore set can have, SEMMNS defines the maximum number of semaphores on the system, while SEMMSL defines the maximum number of semaphores that can be in any semaphore set at one time. Upon creation of a semaphore set, the number of semaphore that the semaphore set must hold is specified.

---

Property 5 (Semaphore Set create( )).
precondition($o_{sma}, O_{sma}$)
    $|O_{sma}| < $ SEMMNI
    $\wedge |o_{sma}| \leq$ SEMMSL
    $\wedge |o_{sma}| + |O_{sem}| \leq$ SEMMNS
    $\wedge \forall o_{sem} \in o_{sma}: o_{sem} \leq$ SEMVMX
postcondition($s, o'_{sma}, O_{sem}, O'_{sem}, O_{sma}, O'_{sma}$)
    $|O'_{sma}| = |O_{sma}| + 1$
    $\wedge |O'_{sem}| = |O_{sem}| + |o'_{sma}|$
    $\wedge o'_{sma} \in O'_{sma}$
    $\wedge O'_{sem} \not\in O_{sma}$
    $\wedge O'_{sem} = O_{sem} \cup o_{sma}$
    $\wedge \text{owner}(o'_{sma}) = s$
Property 6 (Semaphore Set wait( )).
precondition($s, o_{sem}, o_{sma}$)
    WRITE $\in$ perms($s, o_{sma}$)
    $\wedge o_{sem} \in o_{sma}$
    $\wedge o_{sem} > 0$
postconditions($o_{sem}, o'_{sem}$)
    $o'_{sem} = o_{sem} - 1$
Property 7 (Semaphore Set signal ( )).
precondition($s, o_{sem}, o_{sma}$)
    WRITE $\in$ perms,($s, o_{sna}$)
    $\wedge o_{sem} \in o_{sma}$
    $\wedge o_{sen} <$ SEMVMX
postcondition($o_{sem}, o'_{sem}$)
    $o'_{sem} = o_{sem} + 1$
Property 8 (Semaphore Set destroy( )).
precondition($s, o_{sma}$)
    WRITE $\in$ perms($s, o_{sna}$)
postcondition($o_{sma}, O_{sem}, O'_{sem}, O_{sma}, O'_{sma}$)
    $|O'_{sma}| = |O_{sma}| - 1$
    $\wedge |O'_{sem}| = |O_{sem}| - |o_{sma}|$
    $\wedge O'_{sem} = O_{sem} \setminus o_{sma}$
    $\wedge o_{sma} \in O_{sma}$
    $\wedge o_{sma} \not\in O'_{sma}$

---

Similarly, shared memory segments also have system wide limits on a number of things. SHMNI defines the system wide maximum number of shared memory segments that can be allocated. SHMMAX and SHMMIN is the maximum and minimum size in bytes for a shared memory segment.

---

Property 9 (Shared Memory create( )).
precondition($o_{shm}, O_{shm}$)
    $|O_{shm}| <$ SHMMNI
    $\wedge$ SHMMIN $\leq$ size($o_{shm}$) $\leq$ SHMMAX
postcondition($s, o'_{SHM}, O_{shm}, O'_{shm}$)
    $|O'_{shm}| = |O_{shm}| + 1$
    $\wedge o'_{shm} \in O'_{shm}$
    $\wedge o'_{shm} \not\in O_{shm}$
    $\wedge \text{owner}(o'_{shm}) = s$
Property 10 (Shared Memory attach( )).
preconditions($s, o_{shm}$)
    {READ, WRITE} $\subseteq$ permissions($s, o_{shm}$)
postcondition($s, o_{shm}, o'_{shm}$)
    attached($o'_{shm}$) = attached($o_{shm}$) + 1
    $\wedge o_{shm}$ is mapped int o the address space of s
Property 11 (Shared Memory Segment detach ( )).
precondition($s, o_{shm}$)    $o_{shm}$ is mapped into the address space of s
postcondition($s, o_{shm}, o'_{shm}$)
    attached($o'_{shm}$) = attached($o_{shm}$) − 1
    $\wedge o_{shm}$ is removed from the address space of s -continued Property 12 (Shared Memory destroy( )).
precondition($s, o_{shm}$)
    WRITE $\in$ perms($s, o_{shm}$)
    $\wedge$ attached($o_{shm}$) = 0
postcondition($o_{shm}, O_{shm}, O'_{shm}$)
    $|O'_{shm}| = |O_{shm}| - 1$
    $\wedge o_{shm} \in O_{shm}$
    $\wedge o_{shm} \not\in O'_{shm}$

---

Furthermore we can also list the invariants for the system properties.

---

Invariant 1 (Message Queue Invariants).
    $|O_{mq}| \leq$ MSGMNI
    $\forall o_{msg} \in O_{msg}: \text{size}(o_{msg}) \leq$ MSGMAX
    $\forall o_{mq} \in O_{mq}: \Sigma_{omsg \in o_{mq}} \text{size}(o_{msg}) \leq$ MSGNB
Invariant 2 (Semaphore Set Invariants).
    $|O_{sma}| \leq$ SEMMNI
    $|O_{sem}| \leq$ SEMMNI
    $\forall o_{sma} \in O_{sma}: |o_{sma}| \leq$ SEMMSL
    $\forall o_{sma} \in O_{sem}: o_{sem} \leq$ SEMVMX
Invariant 3 (Shared Memory Invariants).
    $|O_{shm}| \leq$ SHMMNI
    $\forall O_{shm} \in O_{shm}:$ SHMMIN $\leq$ size($o_{shm}$) $\leq$ SHMMAX

---

These variants are weak, and they only guarantee that the system is consistent. There are no guarantees for a single user that he has enough resources.

Based on the discussion above regarding user quota, we found that a quota mechanism based on the number of users in the system is the best solution, i.e. Equation 3. However as the number of users grows in the system, each user will have very limited resources. This is especially true for message queues, as there is a system wide maximum of 16 message queues in the default setting. Therefore, in order to be sure that each user has some minimum number of objects available in the system, we have chosen constants which ensures this availability.

As we have chosen this solution, it should be possible for the system administrator to change the denominator constant in Equation 3. Then the system administrator can configure the security on his machine by setting this constant to his own wishes. If desired he can set the constants to the current number of users, and hence it is impossible to carry out a DoS attack against the system. The default values which we have chosen, for the system to be usable, and, at the same time, relatively secure, follows in the next subsections.

Regarding message queues, the system wide default maximum of message queues, MSGMNI, is 16, so we have chosen the denominator constant to be 4, as shown in Equation 4. This choice allows 4 message queues to be created by each user, and it ensures that at least 4 users are required to carry out a DoS attack against the system. The use of System V message queues seems to be very limited, so this seems like a good limit. The only program we have seen using them is Adobe Reader.

$$\text{USER\_MSG\_MAX} = \frac{MSGMNI}{4} = 4 \quad (4)$$

Property 13 (Message Queues create( )).
precondition(s,$O_{mq}$)
   allocated(userDomain(s),$O_{mq}$) < USER_MSG_MAX
postcondition(s,$O_{mq}$,$O'_{mq}$)
   allocated(userDomain(s),$O'_{mq}$) = allocated(userDomain(s),$O_{mq}$)+1
Property 14 (Message Queues destroy( )).
precondition( )
   None, the operation is void if the queue does not exist.
postcondition($o_{mq}$,$O_{mq}$,$O'_{mq}$)
   allocated(userOwner($o_{mq}$),$O'_{mq}$) = allocated(userOwner($o_{mq}$),$O_{mq}$)−1

Regarding the semaphore set, the system wide default maximum of semaphore sets, SEMMNI, is 128, so we have chosen the denominator constant to be 16, as shown in Equation 5. This choice allows each user to create 8 semaphore sets. System V semaphore sets are, as message queues, rarely seen on our system, making this limit a suitable limit. Furthermore it ensures that at least 16 users are required to carry out a DoS attack against the system by creating all semaphore sets.

$$\text{USER\_SEM\_MAX} = \frac{SEMMNI}{16} = 8 \quad (5)$$

Property 15 (Semaphore Set create( )).
precondition(s,$O_{sma}$)
   allocated(userDomain(s),$O_{sma}$) < USER_SEM_MAX
postcondition(s,$O_{sma}$,$O'_{sma}$)
   allocated(userDoinain(s),$O'_{sma}$) = allocated(userDomain(s),$O_{sma}$)+1
Property 16 (Semaphore Set destroy( )).
precondition( )
   None, the operation is void if the set does not exist.
postcondition($o_{sma}$,$O_{sma}$,$O'_{sma}$)
   allocated(userOwner($o_{sma}$),$O'_{sma}$) = allocated(userOwner($o_{sma}$),$O_{sma}$)−1

Regarding shared memory segments, the system wide default maximum of shared memory segments, SHMMNI, is 4096, so we have chosen the denominator constant to be 8, as shown in Equation 6. This choice allows each user to create 512 shared memory segments. The typical number of shared memory segments on our machines, under normal use, is around 20. However, when running Counter Strike under Wine, Wine uses approximately 300 shared memory segments. So, to be on the safe side, we have chosen to allow each user to create 512 shared memory segments. This choice also ensures that at least 8 users are required in order to carry out a DoS attack against the system, which is twice as many as attacking the message queues.

$$\text{USER\_SHM\_MAX} = \frac{SHMMNI}{8} = 512 \quad (6)$$

Property 17 (Shared Memory create( )).
precondition(s,$O_{shm}$)
   allocated(userDomain(s),$O_{sma}$) < USER_SHM_MAX
postcondition(s,$O_{shm}$,$O'_{shm}$)
   allocated(userDomain(s),$O'_{sma}$) = allocated(userDomain(s),$O_{sma}$)+1
Property 18 (Shared Memory destroy( )).
precondition( )
   None, the operation is void if the segment does not exist.
postcondition($o_{shm}$,$O_{shm}$,$O'_{shm}$)
   allocated(userOwner($o_{shm}$),$O'_{shm}$) = allocated(userOwner($o_{shm}$),$O_{shm}$)−1

Regarding the quota module, the user quota mechanism will need to use six LSM hooks, two for shared memory segments, two for semaphore set, and two for message queues. These six hooks can be implemented as follows:

shm_alloc_security( ) Check if the user of the subject has exceeded his shared memory segment quota and deny access if that is the case. Otherwise, increment the number of allocated shared memory segments for the user.

shm_free_security( ) Decrement the number of allocated shared memory segments for the user.

sem_alloc_security( ) Check if the user of the subject has exceeded his semaphore set quota and deny access if that is the case. Otherwise, increment the number of allocated semaphore sets for the user.

sem_free_security( ) Decrement the number of allocated semaphore sets for the user.

msg_queue_alloc security( ) Check if the user of the subject has exceeded his message queue quota and deny access if that is the case. Otherwise, increment the number of allocated message queue for the user.

msg_queue_free security( ) Decrement the number of allocated message queues for the user.

The number of allocated objects (shared memory segments, semaphore set, and message queues) should be stored per user. Unfortunately, the user struct structure does not have a security field usually used in LSM modules. Thus, the quota module must store the number of allocated resources. The UID of the subject is determined through the task_struct and user_struct with current->user->uid.

As the quota module should define default quotas for each object, it should also be possible to change these defaults at run-time using sysctl or the /proc interface. To provide this functionality the module should use register_sysctl_table( ) to register a sysctl table with the kernel. If the quota is lowered no user should lose already allocated objects.

Regarding trusted IPC, trusted IPC is based on signed executables. Each executable is signed with a vendor certificate. To provide trusted IPC, the signed executables are extended with a set of trusted vendor certificate fingerprints. This set is used to determine which subjects are allowed to communicate via IPC.

Regarding vendor certificates, for the purpose of providing unforgeable certificates, we have chosen to use X.509 certificates, a commonly used standard in certificates. Among other things, it is used for signing software for use on a multitude of systems, including mobile platforms. We define C to be the set of all X.509 certificates.

As X.509 certificates can have varying sizes due to, among other factors, key size, we have chosen to use the fingerprint of the certificate. The fingerprint of a certificate can be obtained by running it through a hash function. The hash function we have selected is the SHA-1 secure hash function.

This yields 20 bytes large fingerprints for each certificate. We thus have F which is the set of all fingerprints, defined as $F=\{SHA-1(c)|c \in C\}$.

In general $c_A$ is the X.509 certificate of vendor A, and $f_A$ is the fingerprint of $c_A$, that is $a_A=SHA-1(c_A)$.

Regarding trust, before defining the core concept of our trusted IPC, we need to get some basic definitions in place first.

First we define vendor: $S \rightarrow F$ as the function that returns the vendor certificate fingerprint of the signed executable. Next, we define trustedVendors: $S \rightarrow P(F)$ as the function that returns the set of fingerprints trusted by the signed executable associated with subject s. If the executable associated with s has no executable vendor metadata, then vendor(s)=NULL and trustedVendors(s)={NULL}. Signed executables cannot trust the NULL vendor key.

As the solution component mentioned above had a notion of the kernel trusting vendor keys, we need to define these two sets as well. $T_{kernel} \subseteq F$ is the set of trusted vendor certificate fingerprints, and $U_{kernel} \subseteq F$ is the set of explicitly untrusted vendor certificate fingerprints. Note that $U_{kernel}=\overline{T_{kernel}}$ does not need to hold.

In our solution there exist two possibilities for subjects $s_1$ and $s_2$ to communicate, either the vendors of $s_1$ and $s_2$ must trust each other, or the kernel must trust the vendor of $s_1$ and $s_1$ must trust $s_2$ to communicate. The exact definition of when subjects are allowed to communicate follows.

Definition 1. Given $T_{kernel}, U_{kernel}$ we define the binary relation trusts $\subseteq S \times S$ such that $s_1$ trusts $s_2$ iff vendor($s_2$)$\notin U_{kernel}$ and one of the following conditions are satisfied
1. vendor($s_2$)$\in$trusted($s_1$)
2. vendor($s_2$)$\in T_{kernel}$ Using Definition 1, we can now define mutual trust.

Definition 2. We define the binary relation mutuallyTrusts $\subseteq S \times S$ such that $s_1$ mutuallyTrusts $s_2$ iff $s_1$ trusts $s_2 \hat{ } s_2$ trusts $s_1$.

Definition 3. A subject s can access an IPC object iff s mutuallyTrusts s' for all subjects s', which are currently and have previously been connected to the IPC object.

Figure 8:
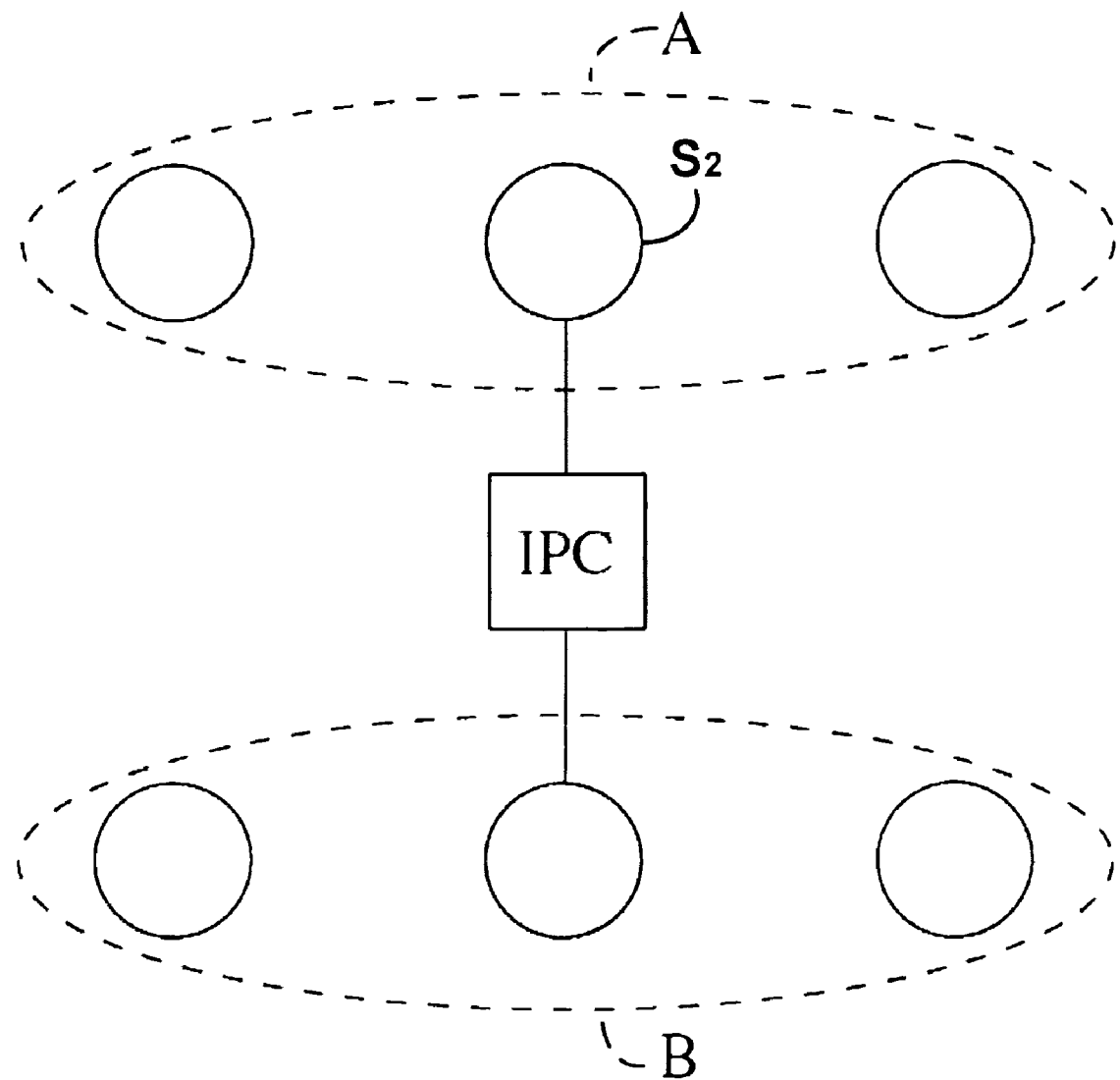
FIG. 8 is a network diagram illustrating an example of vendor trust in which trustedVendors($s_2$)=$\{f_B\}$ and trustedVendors($s_5$)=$\{f_A\}$.
Figure 9:
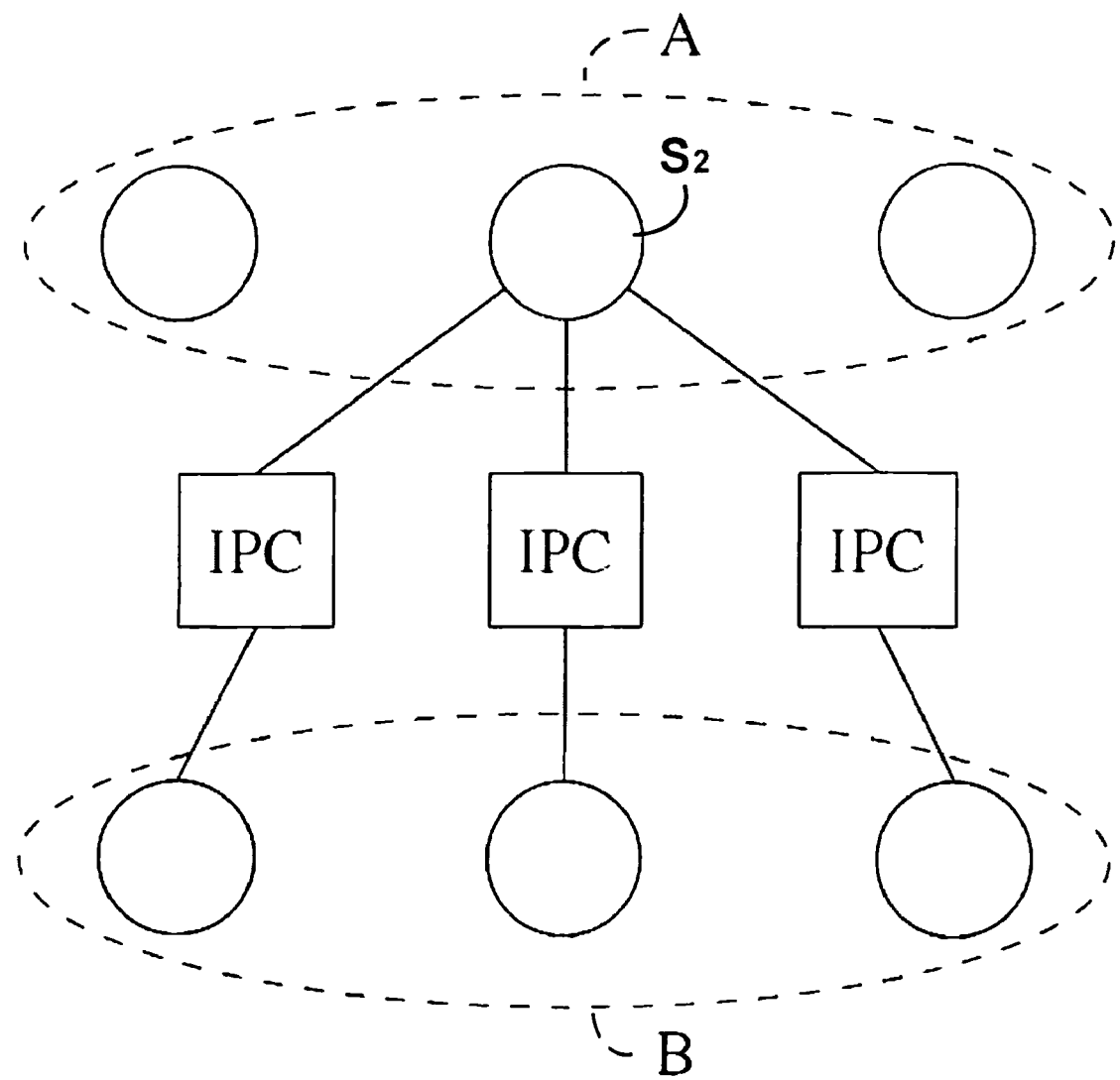
FIG. 9 is a network diagram illustrating an example of vendor trust in which trustedVendors($s_2$)=$\{f_B\}$ and $T_{kernel}=\{f_A\}$.

Turning now to FIG. 8 and FIG. 9, we show the two different kinds of trust between subjects of vendor A and vendor B. For example, in FIG. 8: trustedVendors($s_2$)={$f_B$} and trustedVendors($s_5$)={$f_A$}. In contrast, in FIG. 9: trustedVendors ($s_2$)={$f_B$} and $T_{kernel}$={$f_A$}.

Definitions 1, 2, and 3 form the main part of the secure IPC mechanism. That two subjects are allowed to communicate when they trust each other is reasonable. However, also allowed is for the kernel to trust vendor certificate fingerprints, found in $T_{kernel}$. Subjects associated with executables signed with vendor certificates whose fingerprint is in $T_{kernel}$, are in turn allowed to communicate with all other subjects which they trust. Thus it does not matter if other subjects trusts the subjects in $T_{kernel}$ or not.

Figure 10:
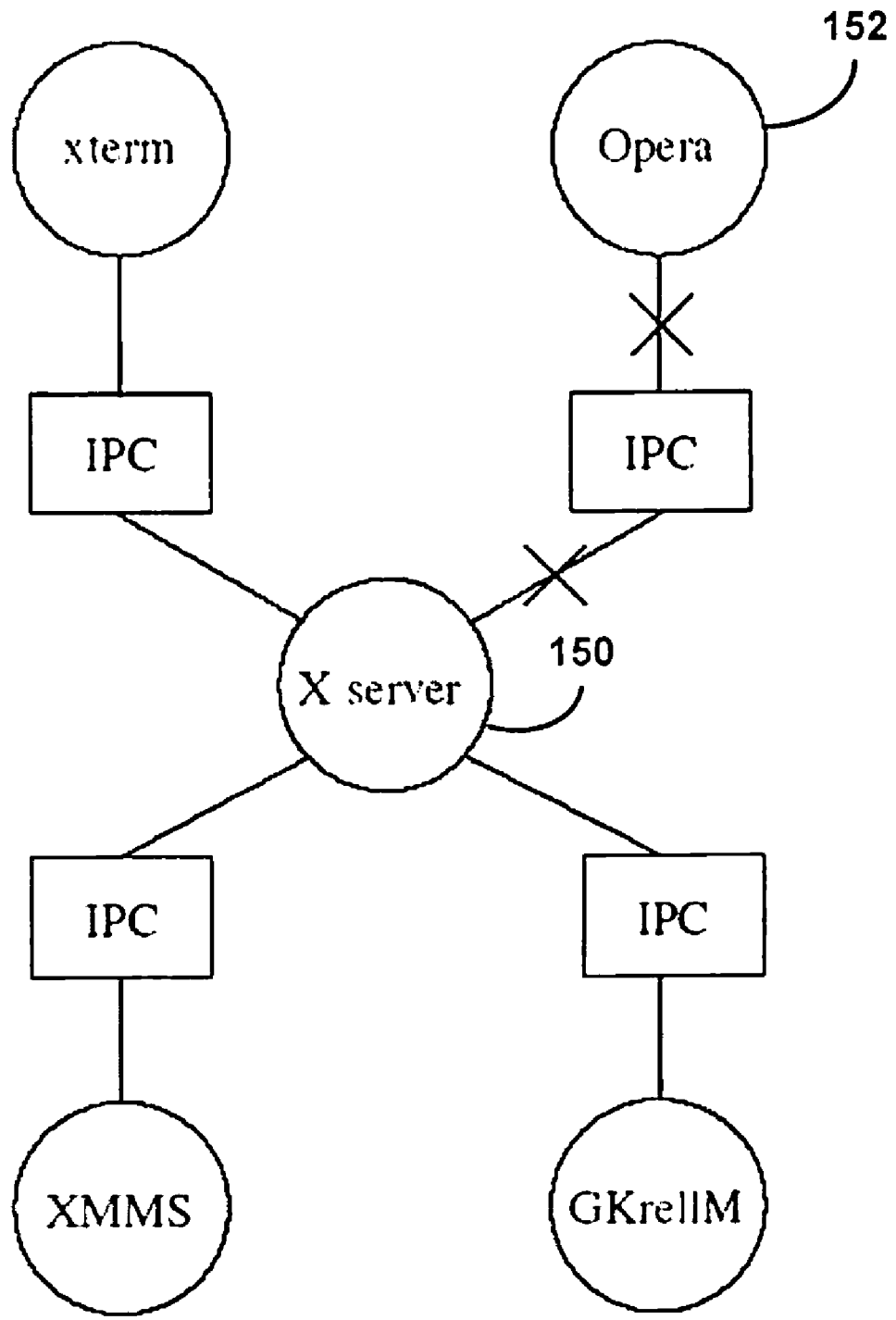
FIG. 10 is a network diagram illustrating an X server that is allowed to communicate with xterm, XMMS and GKrellM but not Opera, when the trust is defined as $T_{kernel}=\{f_X\}$ and trustedVendors($s_X$)=$\{f_{xterm}, f_{XMMS}, f_{GKrellM}\}$.

For example, referring to FIG. 10, the X server 150 does not have to rely on a lot of subjects trusting the X server 150, if the X server 150 is trusted by the kernel. However, this trust requires the developers of the X server to know all software which could use the X server in the system, which is nearly impossible for an application like the X server. In FIG. 10, Opera 152 is not allowed to use the X server 150 because it is not trusted by the X server 150. This could be solved by letting the kernel trust Opera 152.

If the X server 150 is not trusted by the kernel, the other applications (e.g., Opera) could still communicate with the X server 150, if Opera 152 is trusted by the kernel and Opera 152 trusts the X server 150. This is probably the smartest solution for the X server 150, because of the problem mentioned above.

Another example that this solution is a good solution, is that it minimizes the work that the system administrator has to do, to setup the system, compared to the Administrator Domain Separation discussed above. In fact, in the best case where all applications need to trust each other, the administrator does not have to do anything.

Regarding vendors, the executables can be signed with a vendor certificate specifying the software vendor which developed the software. The certificate vendor could be anyone, ranging from large corporations like Microsoft™ and Sun™, to one-man software vendors. However, a corporation like Microsoft™ should not just have one vendor certificate for the entire corporation. Instead, it would be desirable to split it into smaller vendor certificates like "Microsoft™ Office™ Team", "Microsoft™ Windows™ Standard Application Team", "Microsoft™ Internet Explorer™ Team", etc. Then it is not necessary to trust the entire Microsoft™ corporation, but only parts hereof.

However it could sometimes also be desirable to trust large vendors like GNOME™. This is the case when the system administrator wishes that all GNOME™ applications should be able to use IPC. All that he administrator has to do in this case is to make the kernel trust the GNOME™ vendor certificate fingerprint.

The drawback is that the system administrator is bound by the granularity of the vendor certificates. As an example, if Microsoft™ only publishes one certificate for the entire corporation, then one must trust all applications from Microsoft™ even though one only wants to trust a part of Microsoft's™ software suite, like Office™.

Regarding trusted executables, in order to provide trusted IPC, the trust has to begin with the executables themselves. The executables need to be trusted, or else the system cannot know that the executable is from the vendor it says, nor that it trusts the vendor certificates it specifies. In the following, for brevity, we refer to the vendor certificate fingerprint of an executable, and the list of vendor certificate fingerprints that an executable trusts, as executable vendor metadata. Depending on how one selects to distribute the executable vendor metadata, different problems arise.

Regarding storing and distributing executable vendor metadata, for some embodiments, one of the central elements in secure IPC is the integrity of the executables and the vendor certificate fingerprints the executables trust. In some embodiments, the requirements identified for secure IPC are: (1) it should be possible to uniquely identify the vendor of the executable; (2) it should be possible to identify the vendor certificate fingerprints which the executable trusts; and executable vendor metadata needs a persistent and secure storage.

Figure 11:
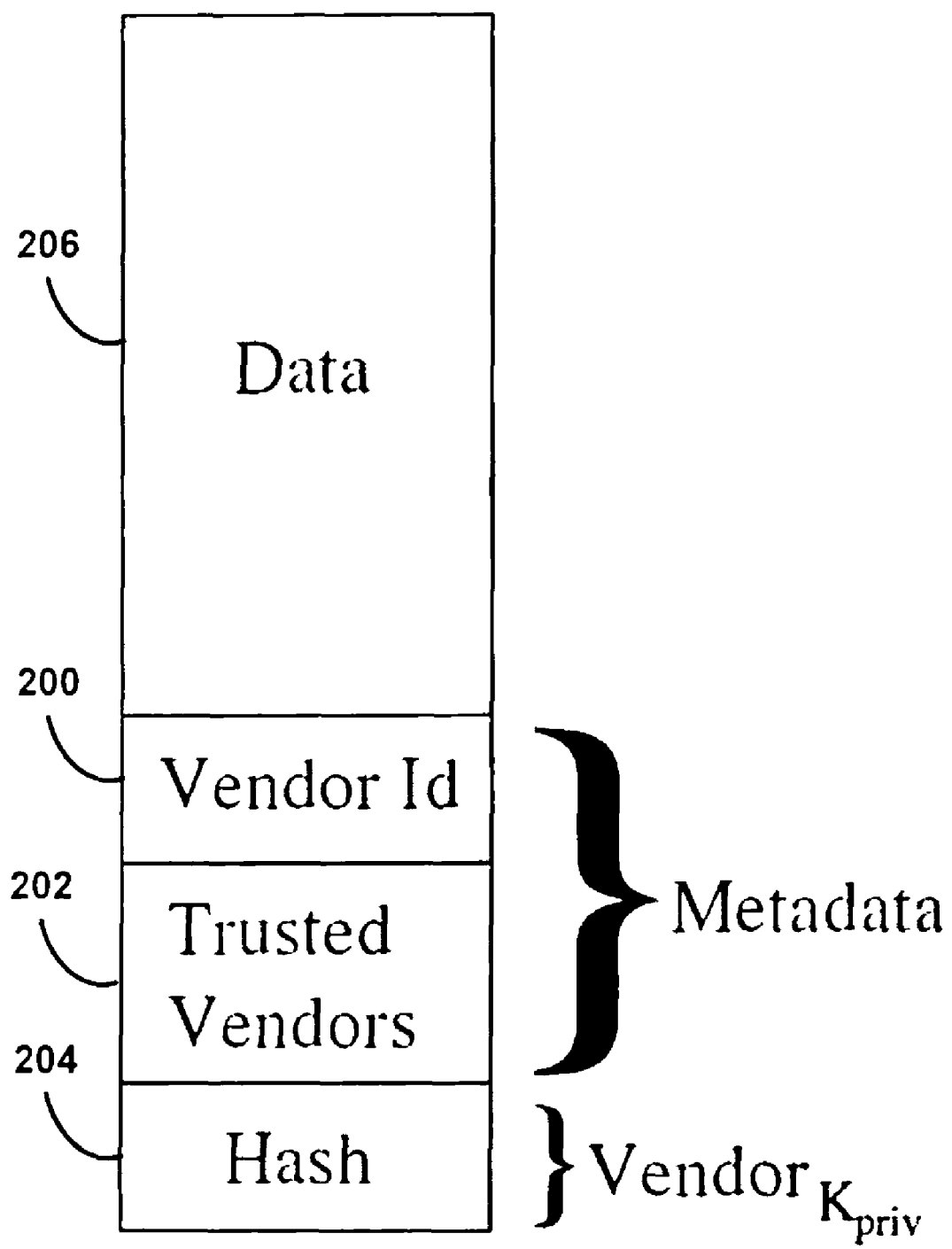
FIG. 11 is a block diagram illustrating layout of a signed executable.

In the process of investigating solutions for this problem, two possible solutions are discussed below. Referring to FIG. 11, the first solution can be implemented like the digitally signed binaries in Umbrella. This solution appends the executable vendor metadata, such as vendor ID 200 and trusted vendors 202, and a hash 204 of the original executable, including data 206 and including executable vendor metadata, to the end of the executable. The hash 204 is signed with the private certificate of the vendor of the executable. The hash value is used for ensuring that the executable and the executable vendor metadata has not been tampered with. If this was not done, it would be possible for the user to copy an executable from /usr/bin to his own home directory, and modify the executable.

The advantage of using this solution is that the executable vendor metadata always stays together with the executable, and it is impossible to alter the executable. This advantage is due to the fact that the executable is hashed and signed with the private certificate of the vendor. However, this solution imposes overhead to the system as the signature has to be checked each time the executable is executed. Furthermore, the executable has to be changed as the executable vendor metadata and hash needs to be appended. When appending this metadata and hash to the end of the executable, there must be a tag which makes it easy to separate the appended executable vendor metadata and hash from the original executable. This tag could be a problem regarding scripts, since the tag must be enclosed in something that makes all scripting languages ignore it.

The second solution is to use extended attributes. Extended attributes are name:value pairs associated permanently with files and directories. The executable vendor metadata is stored in the security attribute namespace. When no security module is loaded, the write access is limited to subjects that have the CAP_SYS_ADMIN capability. If a security module is loaded, the read and write access permissions to security attributes depend on the policy implemented by the security module.

With this second solution, the executable vendor metadata has to be distributed with the executable, as a package. This packaging can be performed by a package manager used by a target Linux distribution. A package is a file in a distribution specific format. It contains the files for a particular application you want to install, which can be several executables, libraries and other files. Known package managers are dpkg, rpm, and portage. With portage, the packages are small shell scripts, and all that is required is making of special packages that install the executable vendor metadata along with the executable itself. While not entirely the same with dpkg, packages handled by this package manager include scripts, which dpkg calls during the installation of a package, so much the same applies here. The same goes for rpm packages. Upon installing the package, the package manager copies the executable vendor metadata to the file system extended attributes. The integrity of the package needs to be verified so that it is known that the package has not been compromised. The package is hashed and then signed with the private certificate of the vendor. To verify the integrity of the package the public certificate of the vendor is needed.

The advantage of this second solution compared to the first solution is that the signature only needs to be checked when the package is installed on the system. As a result, the signature does not need to be stored. Furthermore, no changes to the executable are required and, regarding scripts, no changes are required. The disadvantage of this solution is that the file system needs to support extended attributes. When the extended attributes are needed, they have to be fetched from the file system; this fetching imposes overhead.

For some embodiments, the latter solution is selected for secure IPC, the reason being that it is not necessary to verify the signature every time the executable is executed. Furthermore, it also works with scripts, since there is no need to append anything to the executable. Lastly, the extended attributes are intended for storing data, such as our executable vendor metadata.

Turning our attention now to attacks, using per subject security mechanisms in Unix introduces some vulnerabilities normally not present. This introduction is due to the fact that almost any access control is performed per user. A mechanism with similar vulnerabilities to our trusted IPC solution is the set-user-ID/set-group-ID (setuid/setgid) mechanism. This mechanism allows a subject to run with a different user ID/group ID than its parent, based on the ownership of the corresponding executable. The known vulnerabilities against setuid/setgid include: (1) LD_* environment variables; (2) buffer overflows; and (3) insecure file creation.

Regarding LD_* environment variables, the environment variable LD_LIBRARY_PATH is a list of directories in which the dynamic linker/loader searches for shared libraries, these directories are first searched before the standard search directories are searched. The environment variable LD_PRELOAD is a list of additional shared ELF libraries to be loaded before all others. This can be used to selectively override functions in other shared libraries.

These two environment variables could be a security problem for setuid/setgid executables, as it could be possible to set one of these environment variables to point to some malicious shared libraries. It would then be possible to execute arbitrary code with the permission of another user, such as root. This problem is solved by the dynamic linker/loader as it ignores the LD_LIBRARY_PATH variable if the executable is setuid/setgid. For the LD_PRELOAD variable the following applies: For setuid/setgid ELF binaries, only libraries in the standard search directories that are also setuid will be loaded. For other LD_* variables a description can be found in.

A similar problem with shared libraries exists in trusted IPC. If a subject is authorized to use a trusted IPC object, but LD_LIBRARY_PATH or LD_PRELOAD points to some malicious shared libraries, then the authorized subject will use these libraries. This is due to the fact that the dynamic linker/loader will use the environment variables LD_LIBRARY_PATH and LD_PRELOAD, as the subject not necessarily is setuid/setgid. It would then be possible to get unauthorized access to a trusted IPC object through the shared libraries.

The hooks file_mmap( ) and bprm_secureexec( ) can be used to solve the problem. The first hook is used to check permissions for a mmap operation, that is, map files or devices into memory. It will then be possible to only allow trusted libraries to be mapped into the memory space of an authorized subject.

The latter hook indicates whether libc should enable secure mode. If this is enabled then it is impossible to specify what shared libraries to use through the environment variables LD_LIBRARY_PATH or LD_PRELOAD. Then for every authorized subject the secure mode will be enabled. If a user uses his own dynamic linker/loader, which ignores the secure mode to start an authorized subject, by giving the executable as an argument, then it is not a problem, as it is the dynamic linker/loader that will be seen as the executable by the kernel. The subject will for this reason not get access to a trusted IPC object. For some embodiments, we use the latter hook, as it is only the executable that need to have vendor metadata associated and not also the libraries that the executable uses.

Regarding buffer overflows, if a setuid/setgid executable has a buffer overflow vulnerability it would be possible to run arbitrary code with the permission of another user. Trusted IPC also has a problem with buffer overflows as it would be possible to get unauthorized access to a trusted IPC object. We are not trying to prevent buffer overflows with trusted IPC as buffer overflows are out of the scope of an IPC security mechanism.

Regarding insecure file creation, insecure file creation can occur, for instance, when a subject creates a temporary file in /tmp. This file can be exploited via symlink attacks to overwrite arbitrary files with the privileges of the user running the subject. As trusted IPC will not change the access to files, we will not do anything about this problem in some embodiments.

Regarding some embodiments of the trusted IPC module, the Trusted IPC mechanism will need to use the following LSM hooks. These hooks should be implemented as follows:

bprm_secureexec( ) If the executable does not have any vendor metadata associated, it should not run in secure mode. Otherwise it should run in secure mode. task free security( ) Deallocate what have been allocated in bprm secureexec( ).

shm_alloc security( ) Check if the subject has vendor metadata associated, if this is not the case permission is granted and nothing else is done. Otherwise a list with subjects, and their extended attributes, that are connected is allocated. Last the subject which triggered the hook is added to this list.

shm_free_security( ) Deallocate what have been allocated in shm_alloc security( ).

shm_associate( ) Before the subject can associate with the shared memory segment, it has to comply with Definition 3.

shm_shmctl( ) Before the subject can do memory control operations with the shared memory segment, it has to comply with Definition 3.

shm_shmat( ) Before the subject can attach with the shared memory segment, it has to comply with Definition 3.

sem_alloc_security( ) Check if the subject has vendor metadata associated, if this is not the case permission is granted and nothing else is done. Otherwise a list with subjects, and their extended attributes, that are connected is allocated. Last the subject which triggered the hook is added to this list.

sem_free_security( ) Deallocate what have been allocated in sem_alloc security( ).

sem_associate( ) Before the subject can associate with the semaphore, it has to comply with Definition 3.

sem_semctl( ) Before the subject can perform semaphore operation on the semaphore set, it has to comply with Definition 3.

sem_op( ) Before the subject can perform semaphore operation on members of the semaphore set, it has to comply with Definition 3.

msg_queue_alloc_security( ) Check if the subject has vendor metadata associated, if this is not the case permission is granted and nothing else is done. Otherwise a list with subjects, and their extended attributes, that are connected is allocated. Last the subject which triggered the hook is added to this list.

msg_queue_free security( ) Deallocate what have been allocated in msg alloc security( ).

msg_queue_associate( ) Before the subject can associate with the message queue, it has to comply with Definition 3.

msg_queue_msgrcv( ) Before the subject can receive a message from the message queue, it has to comply with Definition 3. This is necessary as it is possible to receive messages without associating with the message queue.

msg_queue_msgsnd( ) Before the subject can send a message to the message queue, it has to comply with Definition 3. This is necessary as it is possible to send messages without associating with the message queue.

msg_queue_msgctl( ) Before the subject can perform message control operations on the message queue, it has to comply with Definition 3.

Figure 12:
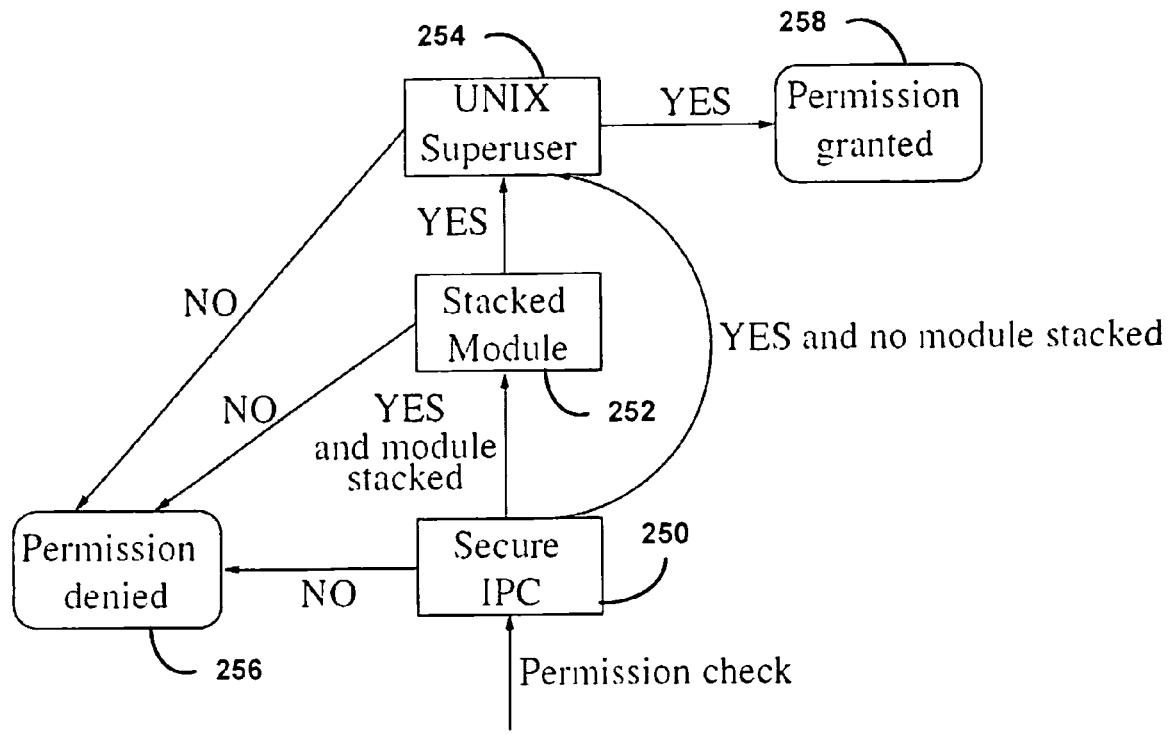
FIG. 12 is a functional block diagram illustrating structure of a stacking mechanism.

With various solution components identified, and a particular combination of certain ones of these components selected during a design of a secure IPC module, it is now possible to describe a particular implementation as an embodiment of the secure IPC module. In this embodiment, and referring particularly to FIG. 12, the module is implemented as a stackable module. If it is the first security module 250 loaded, stacking another module 252 on top of it is possible. To be stackable, all the security hooks described in include/linux/security.h have been implemented in the file secure-ipc.c. The Secure IPC module does not use all the hooks. Those hooks that are used are described below. If a hook is used by module 250, it is called first to decide if permission is granted. If permission is granted, the hook in the module 252 stacked on top of module 250 is called to decide if permission should be granted. If the stacked module 252 also grants permission, or there is no module stacked on top of module 250 then a dummy hook function 254 that enforces traditional UNIX superuser semantics, is called. If at any time permission is denied, then permission is finally denied at 256. For permission to be finally granted at 258, then it is necessary for permission to be granted at each of the IPC modules 250 and 252, and also at the dummy hook function 254.

Regarding the quota mechanism, the quota mechanism is implemented in the file quota.c, and is implemented as described above. The struct user_security, which can be seen in the computer code presented below, keeps track of the users in the system, and a hash table is used to quickly find a user security with uid as hash key.

```
1    struct user_security {
2        struct hlist_node list;
3        struct security_struct security;
4        uid_t uid;
5    };
Psuedocode user_security
```

The first time a user creates an IPC object a new user_security is allocated, and when the user has deleted all the IPC objects the user_security is deallocated.

The security_struct, presented in computer code below, keeps track of how many messages queues, semaphore sets, and shared memory segments a user has allocated.

```
1    struct security_struct {
2        int msg;
3        int sem;
4        int shm;
5    };
Psuedocode security struct
```

The number of IPC objects that a user can allocate can be changed through the files msg, sem, and shm in /proc/sys/secure_ipc/.

The six hooks, as described above, are implemented as follows:

shm_alloc_security( ) If a user_security struct does not exist for the user a new one is allocated. If the user has exceeded his shared memory segment quota, access is denied. Otherwise, shm is incremented by one.

shm_free_security( ) shm is decremented by one. If shm, sem, and msg are all zero then the user_security struct for the user is deallocated.

sem_alloc_security( ) If a user_security struct does not exist for the user a new one is allocated. If the user has exceeded his semaphore set quota, access is denied. Otherwise, sem is incremented by one.

sem_free_security( ) sem is decremented by one. If shm, sem, and msg are all zero then the user_security struct for the user is deallocated.

msg_queue_alloc security( ) If a user_security struct does not exist for the user a new one is allocated. If the user has exceeded his message queue quota, access is denied. Otherwise, msg is incremented by one.

msg_queue_free security( ) msg is decremented by one. If shm, sem, and msg are all zero then the user_security struct for the user is deallocated.

Figure 13:
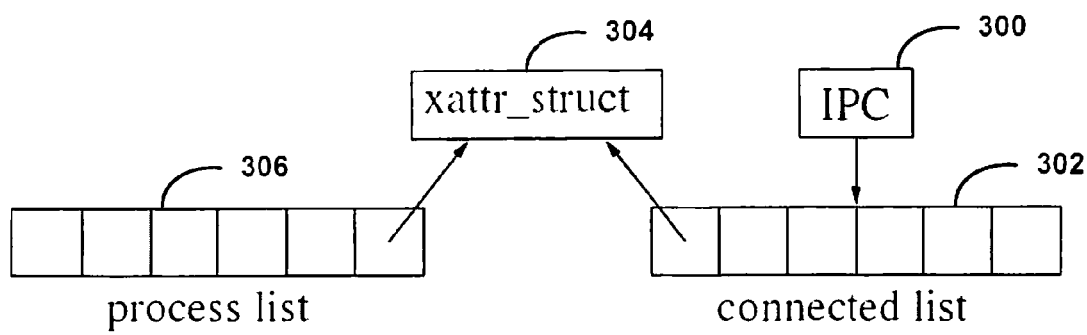
FIG. 13 is a block diagram illustrating informational structure of a trusted IPC mechanism.

Turning now to FIG. 13, main parts of the structure of trusted IPC include four structs which hold various information about the IPC object and the subjects which have attached to the IPC object. The first struct is the ipc_struct 300, which is used to identify the IPC object and the processes connected. A *ipc pointer is used to identify the IPC object, and connected is a list 302 of vendor metadata from processes which have been attached to the IPC object, the elements in this list 302 are of the type connected_struct. Both ipc_struct and connected_struct are shown in computer code below.

```
1    struct ipc_struct {
2        struct hlist_node list;
3        void *ipc.
4        struct list_head connected;
5        spinlock_t lock_connected;
6    };
Computer code ipc_struct
1    struct connected_struct {
2        struct list_head list;
3        struct xattr_struct *xattr;
4    };
Psuedocode connected_struct
```

IPC object has a list of vendor metadata from processes which has been attached to the object. Note that the vendor metadata from a process will not be removed when the process is terminated. A hash table is used to quickly find an IPC object and it is the ipc field that is used as hash key.

The xattr_struct 304, shown in computer code below, is used to hold executable vendor metadata. The vendor array is used to store the vendor key of the process. The vendor keys the process trusts are stored in the trusts array, and count reflects the number of vendor keys stored in the trusts array. The count connected field indicates when the xattr_struct can be deallocated. When a xattr_struct is allocated the field is initialized to one, and is incremented by one every time the process either creates a new IPC object or attaches to an already existing IPC object. The field is decremented by one when the process terminates or when an IPC object which the process has been attached to is destroyed.

```
1    struct xattr_struct {
2        atomic_t count_connected;
3        unsigned char vendor[FPP_SIZE];
4        unsigned int count;
5        unsigned char trusts [ ] [FPP_SIZE];
6    };
psuedocode: xattr struct
```

The last struct is the process_struct 306 provided in computer code below. This struct is used to find the vendor metadata for the current process. A hash table is used to find the process_struct for the current process, and the tgid is used as hash key. *xattr points at the process vendor metadata and tgid is used to identify the process. The tgid (thread group id) is used and not pid (process id), because the tgid is the same for all threads in a multi threaded program, whereas the pid is unique for all threads.

```
1    struct process_struct {
2        struct hlist_node list;
3        struct xattr_struct *xattr;
4        pid_t tgid;
5    };
psuedocode: process_struct
```

Regarding the permission check, we have divided the implementation of Definition 3 into three functions, trusts( ), kerneltrust( ), and check_definition( ). The functions are in alloc_ipc.c. The vendor keys, which the administrator does not trust, are stored in /etc/sipc/untrusted, and the vendor keys he does trust are stored in /etc/sipc/trusted. Note that the vendor keys are loaded into the hash tables kernel_untrusted and kernel_trusted when the module is loaded. This happens in the sipc_init( ) function in secure-ipc.c. The function trusts( ) checks the condition vendor($s_1$)∈trusted($s_2$)^vendor ($s_2$)∈trusted($s_1$).

Regarding trust, the trusts( ) function is shown in computer code below. It takes two xattr_struct structs as parameters and returns 1 if the vendors in these structs trust each other, otherwise it returns 0.

```
1    /* Return 1 if a and b trust each other, otherwise 0.*/
2    static int trusts (struct xattr_struct *a, struct
         xattr_struct *b)
3    {
4        int i, trusted;
5
6        if (!memcmp(a-> vendor, b-> vendor FPP_SIZE))
7            return 1;
8
9    trusted = 0;
10   for (i-0; i < a -> count; i++ {
11       if (!memcmp (a - > vendor, &b -> trusts [ i ], FPP_SIZE)) {
12           trusted = 1;
13           break;
14       }
15   }
16
17   if (!trusted)
18       return 0;
19
20   trusted = 0;
21   for (i = 0; i < b -> count; i++) {
22       if (!memcmp (b -> vendor, &a ->trusts [ i ], FPP_SIZE)) {
23           trusted = 1;
24           break;
25       }
26   }
27
28   if (!trusted)
29       return 0;
30
31   return 1;
32   }
Psudocode Check if vendor($s_1$) ∈ trusted($s_2$) ∧ vendor($s_2$) ∈ trusted($s_1$)
```

Lines 6-7 check if the same vendor key is in both structs and returns 1 if they are, as vendor(s)∈trusted(s). Definition 2 states that the processes must trust each other. One way for the processes to trust each other is for them to satisfy Definition 1 condition 2. This condition is tested in lines 9-29, so both vendor(s1) E trusted($s_2$), and that vendor($s_2$)∈trusted($s_1$). If they are not, 0 is returned in lines 18 and 29 respectively. If both checks pass, 1 is returned, and both vendors trust each other.

Regarding kernel trust, the function kerneltrust( ) checks the condition:

$$vendor(s_1) \notin trusted(s_2)$$
$$\wedge\, vendor(s_2) \in T_{kernel}$$
$$\vee\, vendor(s_2) \in trusted(s_1)$$
$$\wedge\, vendor(s_1) \in T_{kernel}$$
$$\vee\, vendor(s_1), vendor(s_2) \in T_{kernel}$$

Part of the function is shown below. The kerneltrust( ) function takes two xattr_struct structs as parameters, and an integer that indicates whether the second xattr_struct struct is trusted by the kernel. The function returns 1, if the vendors trust each other, otherwise it returns 0.

In lines 4-9 the function checks if vendor($s_1$)∈trusted($s_2$)^vendor($s_2$)∈$T_{kernel}$. If this is not the case, it checks if vendor ($s_2$)∈trusted($s_1$)^vendor($s_1$)∈$T_{kernel}$. It does this by first performing a lookup in the kernel_trusted hash table for the vendor key stored in s_1. If the vendor key is found in the hash table, it continues to check if the vendor of s_1 trusts the vendor of s_2, if it does, the value 1 is returned. This happens in lines 11-23.

Finally we check to see if vendor($s_1$),vendor($s_2$)∈$T_{kernel}$. This is done in lines 14-15. It simply checks if the vendor keys stored in s_1 and s_2 are in the kernel_trusted hash table and returns 1, if they are.

```
1     static int kerneltrust (struct xattr_struct *s_1, struct
          xattr_struct *s_2, int trusted)
2     {
3        // SNIP local variables
4        if (trusted) {
5          for (i = 0; i < s_2 -> count; i++) {
6            if (!memcmp(s_1 -> vendor, &s_2 -> trusts [ i ],
                FPP_SIZE))
7              return 1;
8          }
9        }
10
11       hlist_for_each_entry (trusted_vendor, elem,
12          &kernel_trusted [vendor_hashfn (*(s_1 ->
               vendor))], list ) {
13          if (!memcmp(trusted_vendor ->vendor, s_1 -> vendor,
               FPP_SIZE)) {
14            if (trusted)
15              return 1;
16
17            for (i= 0; i < s_1 -> count; i++) {
18              if (!memcmp (s_2 - > vendor, $s_1 - > trusts [ i ],
                  FPP_SIZE))
19                return 1;
20            }
21            break;
22          }
23       }
24
25       return 0;
26    }
```

The function check_definition ( ) is the function that decides, if access can be granted to an IPC object with help from the functions trusts (and kerneltrust( ). Part of the function can be seen below. It takes two parameters, an xattar_struct struct from the process that wishes to access the IPC object and a list of xattr_struct structs that have already accessed the IPC object. It returns −1, if permission is not granted, 0 if permission is granted, and 1 if permission is granted and an identical xattr_struct struct already exists in the list of xattr_struct structs that has accessed the IPC object previously.

In lines 4-8 the function checks if vendor($s_1$)∈$\cup_{kernel}$. It is done by looking for the vendor key of the process in the hash table kernel_untrusted. The process will be denied access to an IPC object, if the vendor is untrusted.

The check vendor($s_1$)∈$T_{kernel}$ is done in lines 9-15, by looking for the vendor key of the process in the hash table kernel_trusted, and the result of this check is used in the function kerneltrust( ).

Lines 16-26 check that each of the vendors, in the list of xattr_struct structs who have accessed the IPC object, trusts the vendor of the process that wishes to access the IPC object. Also, it is checked that the vendor of the process trying to access the IPC objects trusts all vendors of processes that have accessed the same IPC object. This is done by first checking if an identical xattr_struct struct has already accessed the IPC object, in which case permission is granted.

If permission is not granted, kerneltrust( ) is called, and if it returns 0 trusts ( ) is called. If the vendors does not trust each other then permission cannot be granted, and −1 is returned in line 25.

If all the vendors trusts each other permission is granted in line 27.

```
1     static int check_definition (struct xattr-struct *xattr,
          Struct list_head *connected_list)
2     {
3        // SNIP local variables.
4        hlist_for_each_entry (untrusted_vendor, elem,
5          &kernel_untrusted [vendor_hashfn (*(xaffr ->
             vendor))], list)    {
6          if (!memcmp (untrusted_vendor ->vendor, xattr ->vendor,
             FPP_SIZE))
7            return −1;
8        }
9        hlist_for_each_entry (trusted_vendor, elem,
10         &kernel_truste [vendor_hashfn(*xattr ->
             vendor))], list ) }
11         if (!memcmp (trusted_vendor ->vendor, xattr -> vendor,
             FPP_SIZE)) {
12           trusted = 1
13           break
14         }
15       }
16       list_for_each (c, connected_list) {
17         connected = list_entry (c, struct connected_struct,
             list);
18         if (connected ->xattr -> count == xattr -> count
19            && !memcmp (connected -> xattr -> vendor, xattr
               ->vendor, FPP_SIZE)
20            && !memcmp (connected -> xattr -> trusts, xattr
               ->trusts, xattr -> count * FPP_SIZE))
21           return 1;
22
23         rc = kerneltrsut (connected ->xattr, xattr, trusted);
24         if (!rc && !trusts (connected -> xattr, xattr))
25           return −1;
26       }
27       return 0;
28    }
```

Note that when we compare two xattr_struct struct in lines 18-20, we do not compare the count_connected field. The reason for this is that count_connected is only used to indicate when the xattr_struct struct can be deallocated, and do not have any effect on the vendor keys stored in the xattr_struct struct. If we compare the count_connected field, then two xattr_struct struct with identical vendor keys could be in the list of xattr_struct struct that had accessed the IPC object, but that will not make any difference in deciding whether access should be granted to the IPC object.

Regarding hooks, the hooks for Trusted IPC are implemented in the file alloc_ipc.c except the hooks bprm_secureexec( ) and task_free_security( ) which are implemented in the file load_exec.c. The hooks are implemented as follows:

bprm_secureexec( ) If the executable is stored on a file system with extended attributes, and has any executable vendor metadata associated in the extended attribute name space security.t-ipc, then a xattr_struct struct and a process_struct struct is allocated for the current process. The executable vendor metadata is saved in xattr_struct struct and the current process will run in secure mode. Secure mode is used to prevent attacks based on the LD_* environment variables, this is described in Section 7.1.2.

task_free_security( ) Deallocates the process-struct struct for the current process. If count_connected in the xattr_struct struct is zero after being decremented, the xattr_struct struct will be deallocated.

shm_alloc_security( ) Implemented in the function alloc_ipc( ).

shm_free_security( ) Implemented in the function free_ipc( ).

shm_associate( ) Implemented in the function check_permission( ).

shm_shmctl( ) Permission is granted if the cmd parameter is IPC_INFO, SHM_INFO, or SHM_STAT, which will make it possible to use the command ipcs. The rest of the hook is implemented in the function check_permission( ).

shm_shmat( ) Implemented in the function check_permission( ).

sem_alloc_security( ) Implemented in the function alloc_ipc( ).

sem_free_security( ) Implemented in the function free_ipc( ).

sem_associate( ) Implemented in the function check_permission( ).

sem_semctl( ) Permission is granted if the cmd parameter is IPC_INFO, SEM_INFO, or SEM_STAT, which will make it possible to use the command ipcs. The rest of the hook is implemented in the function check_permission( ).

sem_op( ) Implemented in the function check_permission( ).

msg_queue_alloc_security( ) Implemented in the function alloc_ipc( ).

msg_queue_free_security( ) Implemented in the function free_ipc( ).

msg_queue_associate( ) Implemented in the function check_permission( ).

msg_queue_msgrcv( ) Implemented in the function check_permission( ).

msg_queue_msgsnd( ) Implemented in the function check_permission( ).

msg_queue_msgctl( ) Permission is granted if the cmd parameter is IPC_INFO, MSG_INFO, or MSG_STAT, which will make it possible to use the command ipcs. The rest of the hook is implemented in the function check_permission( ).

alloc_ipc( ) If a xattr_struct struct exists for the creating process, and the vendor is not untrusted, then an ipc_struct struct and a connected_struct struct is allocated. The xattr field of the connected_struct struct will point to the xattr_struct struct of the creating process. Permission granted in this hook, if the vendor of the creating process is not untrusted.

free_ipc( ) Deallocates the ipc_struct and all the connected_struct structs allocated for the IPC object. If count_connected is zero after it has been decremented in one of the xattr_struct structs the xattr_struct struct is deallocated.

check_permission( ) If an ipc_struct struct does not exist for the IPC object, either the IPC object already existed when the module was loaded, or the IPC object was created by a process without a xaftr_struct struct.

Permission is granted if an ipc_struct struct does not exist for the IPC object, and a xattr_struct struct does not exist for the connecting process.

Permission is neither granted if an ipc_struct struct exists for the IPC object, but a xattr_struct struct does not exist for the connecting process, nor if an ipc_struct struct does not exist for the IPC object, while a xattr_struct struct exists for the connecting process.

If the ipc_struct struct exists for the IPC object and the xattr_struct struct exists for the connecting process, then Definition 5.4.3 will be checked through the functions trusts( ) and kerneltrust( ) as described earlier. If permission is granted, a connected_struct struct is allocated and added to the ipc_struct struct just when an identical xattr_struct struct is not already connected to the ipc_struct struct, Now that an implementation has been provided, we turn our attention to discussing some alternative and additional embodiments of the module.

Some embodiments can have executable vendor metadata. For example, two or more identical sets of executable vendor metadata can be stored in memory, e.g. if the same executable is launched more than once. The implementation described above has no checks for this. Preventing executable vendor metadata from being stored more than once would save memory, but will incur runtime overhead every time a process is started. A decision about implementing such a check can be based on whether time or memory are more valuable.

Regarding kernel trust, in the implementation described above, the files /etc/sipc/trusted and /etc/sipc/untrusted are only read when the module is loaded; it is not possible to reload the files when the module has been loaded. In some embodiments, it is possible for the system administrator to change which keys are trusted and untrusted, while the module is loaded. The resulting advantage is that it is possible to alter which vendors are trusted or not, without having to reload the module.

This ability is obviously a disadvantage as the system is left in an insecure state in between the unloading and loading of the module. However if it is possible to alter the trusted and untrusted vendors when the module is loaded, it raises a number of questions:

1. If vendors are deleted from /etc/sipc/trusted, should the subjects, whose executable are signed with the vendor certificate fingerprint of these vendors, then be detached from all current IPC objects to which they are currently attached?

2. If vendors are deleted from /etc/sipc/untrusted, should the subjects, whose executable are signed with the vendor certificate fingerprint of these vendors, and thus have previously been denied access, be granted access right away?

3. If vendors are added to /etc/sipc/trusted, should the subjects, whose executable are signed with the vendor certificate fingerprint of these vendors, and have previously been denied access, be granted access right away?

4. If vendors are added to /etc/sipc/untrusted, should the subjects, whose executable are signed with the vendor certificate fingerprint of these vendors, and have previously been attached to IPC objects, be detached from these IPC objects?

We do not believe that the module should do any of the above actions if it is possible to alter the files when the module is loaded. Actions one and four are not feasible as subjects risk failing when we detach them from the IPC object. Actions two and three are not without problems either, because we do not know if the vendors asking for access earlier still want access now.

What is claimed is:

1. A computer system securing inter-process communication (IPC) based on trust, the system comprising:
   a user quota mechanism providing resource management of IPCs, wherein a single user is allowed to allocate a fixed amount of objects within a system maximum, the fixed amount being less than the system maximum; and
   a trusted IPC mechanism, embodied as computer executable instructions executed by a computer processor, mediating access to IPC objects by employing signed executables signed by a key and containing a list of trusted keys, and using a trust relationship among a set of subjects connected to an IPC to determine whether communication can be carried out between processes, wherein in order for the processes to communicate via an IPC, either they have to trust each other, or a kernel must trust one process and that process must also trust the other process;
   wherein said trusted IPC mechanism classifies subjects into domains and prevents a subject, which is misbehaving in one of the domains, from affecting subjects in another of the domains;
   wherein said trusted IPC mechanism verifies that executables are signed with a vendor key that is a certificate uniquely identifying a software vendor that created the executable, wherein, upon execution, the vendor key is linked with a resulting subject, so the vendor key can always be found; and
   wherein said trusted IPC mechanism employs a kernel trust scheme in which the kernel trusts multiple vendor keys, and all subjects signed with vendor keys trusted by the kernel are allowed to communicate with each other, but untrusted subjects, those subjects that are either not signed with a vendor key or are not signed with a vendor key trusted by the kernel, are allowed to communicate with one another, but not with trusted subjects.

2. A computer system securing inter-process communication (IPC) based on trust, the system comprising:
   a user quota mechanism providing resource management of IPCs, wherein a single user is allowed to allocate a fixed amount of objects within a system maximum, the fixed amount being less than the system maximum; and
   a trusted IPC mechanism, embodied as computer executable instructions executed by a computer processor, mediating access to IPC objects by employing signed executables signed by a key and containing a list of trusted keys, and using a trust relationship among a set of subjects connected to an IPC to determine whether communication can be carried out between processes, wherein in order for the processes to communicate via an IPC, either they have to trust each other, or a kernel must trust one process and that process must also trust the other process;
   wherein said trusted IPC mechanism classifies subjects into domains and prevents a subject, which is misbehaving in one of the domains, from affecting subjects in another of the domains;
   wherein said trusted IPC mechanism verifies that executables are signed with a vendor key that is a certificate uniquely identifying a software vendor that created the executable, wherein, upon execution, the vendor key is linked with a resulting subject, so the vendor key can always be found; and
   wherein said trusted IPC mechanism lets each vendor specify which vendor keys they trust; and allows subjects signed with a first vendor's key to receive messages from subjects signed with a second vendor's key only if the first vendor trusts the second vendor.

3. A computer system securing inter-process communication (IPC) based on trust, the system comprising:
   a user quota mechanism providing resource management of IPCs, wherein a single user is allowed to allocate a fixed amount of objects within a system maximum, the fixed amount being less than the system maximum; and
   a trusted IPC mechanism, embodied as computer executable instructions executed by a computer processor, mediating access to IPC objects by employing signed executables signed by a key and containing a list of trusted keys, and using a trust relationship among a set of subjects connected to an IPC to determine whether communication can be carried out between processes, wherein in order for the processes to communicate via an IPC, either they have to trust each other, or a kernel must trust one process and that process must also trust the other process;
   wherein said trusted IPC mechanism requires that vendors of software programs specify execute restrictions and embed these restrictions in a signature which is used to sign a binary program; and
   wherein said trusted IPC mechanism uses extended attributes that are name value pairs associated permanently with files and directories, wherein: (a) executable vendor metadata is stored in a security attribute namespace and distributed with an executable as a package; (b) when no security module is loaded, write access is limited to subjects that have a CAP_SYS_ADMIN capability; (c) if a security module is loaded, read and write access permissions to security attributes depend on a policy implemented by the security module; and (d) upon installing the package, a package manager copies the executable vendor metadata to the extended attributes of the file system.

4. A computer system securing inter-process communication (IPC) based on trust, the system comprising:
   a user quota mechanism providing resource management of IPCs, wherein a single user is allowed to allocate a fixed amount of objects within a system maximum, the fixed amount being less than the system maximum; and
   a trusted IPC mechanism, embodied as computer executable instructions executed by a computer processor, mediating access to IPC objects by employing signed executables signed by a key and containing a list of trusted keys, and using a trust relationship among a set of subjects connected to an IPC to determine whether communication can be carried out between processes, wherein in order for the processes to communicate via an IPC, either they have to trust each other, or a kernel must trust one process and that process must also trust the other process;
   wherein said trusted IPC mechanism requires that vendors of software programs specify execute restrictions and embed these restrictions in a signature which is used to sign a binary program;
   wherein said trusted IPC mechanism uses extended attributes that are name value pairs associated permanently with files and directories, wherein: (a) executable vendor metadata is stored in a security attribute namespace and distributed with an executable as a package; (b) when no security module is loaded, write access is limited to subjects that have a CAP SYS ADMIN capability; (c) if a security module is loaded, read and write access permissions to security attributes depend on a policy implemented by the security module; and (d) upon installing the package, a package manager copies the executable vendor metadata to the extended attributes of the file system; and wherein the package is hashed and then signed with a private certificate of a vendor of the executable, and integrity of the package is verified using a public certificate of the vendor to determine whether the package has been compromised.

5. A computer system securing inter-process communication (IPC) based on trust, the system comprising:

a user quota mechanism providing resource management of IPCs, wherein a single user is allowed to allocate a fixed amount of objects within a system maximum, the fixed amount being less than the system maximum; and a trusted IPC mechanism, embodied as computer executable instructions executed by a computer processor, mediating access to IPC objects by employing signed executables signed by a key and containing a list of trusted keys, and using a trust relationship among a set of subjects connected to an IPC to determine whether communication can be carried out between processes, wherein in order for the processes to communicate via an IPC, either they have to trust each other, or a kernel must trust one process and that process must also trust the other process;

wherein said trusted IPC mechanism is a stackable security module, wherein if a first security module is loaded, stacking a second security module on to of it is possible, and permission checks must be passed for each module from bottom to top in order for permission finally to be granted; and wherein a topmost stackable security module calls a dummy hook function that enforces superuser semantics.

6. A method of securing inter-process communication (IPC) based on trust, comprising:

providing a user quota mechanism to provide resource management of IPCs, wherein a single user is allowed to allocate a fixed amount of objects within a system maximum, the fixed amount being less than the system maximum; and providing a trusted IPC mechanism, embodied as computer executable instructions executed by a computer processor, to mediate access to IPC objects by employing signed executables signed by a key and containing a list of trusted keys, and using a trust relationship among a set of subjects connected to an IPC to determine whether communication can be carried out between processes, wherein in order for the processes to communicate via an IPC, either they have to trust each other, or a kernel must trust one process and that process must also trust the other process;

further comprising classifying subjects into domains and preventing a subject, which is misbehaving in one of the domains, from affecting subjects in another of the domains;

further comprising verifying that executables are signed with a vendor key that is a certificate uniquely identifying a software vendor that created the executable, wherein, upon execution, the vendor key is linked with a resulting subject, so the vendor key can always be found; and further comprising employing a kernel trust scheme in which the kernel trusts multiple vendor keys, and all subjects signed with vendor keys trusted by the kernel are allowed to communicate with each other, but untrusted subjects, those subjects that are either not signed with a vendor key or are not signed with a vendor key trusted by the kernel, are allowed to communicate with one another, but not with trusted subjects.

7. A method of securing inter-process communication (IPC) based on trust, comprising:

providing a user quota mechanism to provide resource management of IPCs, wherein a single user is allowed to allocate a fixed amount of objects within a system maximum, the fixed amount being less than the system maximum; and providing a trusted IPC mechanism, embodied as computer executable instructions executed by a computer processor, to mediate access to IPC objects by employing signed executables signed by a key and containing a list of trusted keys, and using a trust relationship among a set of subjects connected to an IPC to determine whether communication can be carried out between processes, wherein in order for the processes to communicate via an IPC, either they have to trust each other, or a kernel must trust one process and that process must also trust the other process;

further comprising classifying subjects into domains and preventing a subject, which is misbehaving in one of the domains, from affecting subjects in another of the domains;

further comprising verifying that executables are signed with a vendor key that is a certificate uniquely identifying a software vendor that created the executable, wherein, upon execution, the vendor key is linked with a resulting subject, so the vendor key can always be found; and further comprising:
letting each vendor specify which vendor keys they trust; and
allowing subjects signed with a first vendor's key to receive messages from subjects signed with a second vendor's key only if the first vendor trusts the second vendor.

8. A method of securing inter-process communication (IPC) based on trust, comprising:

providing a user quota mechanism to provide resource management of IPCs, wherein a single user is allowed to allocate a fixed amount of objects within a system maximum, the fixed amount being less than the system maximum; and providing a trusted IPC mechanism, embodied as computer executable instructions executed by a computer processor, to mediate access to IPC objects by employing signed executables signed by a key and containing a list of trusted keys, and using a trust relationship among a set of subjects connected to an IPC to determine whether communication can be carried out between processes, wherein in order for the processes to communicate via an IPC, either they have to trust each other, or a kernel must trust one process and that process must also trust the other process;

further comprising requiring that vendors of software programs specify execute restrictions and embed these restrictions in a signature which is used to sign a binary program;

further comprising using extended attributes that are name value pairs associated permanently with files and directories, wherein: (a) executable vendor metadata is stored in a security attribute namespace and distributed with an executable as a package; (b) when no security module is loaded, write access is limited to subjects that have a CAP SYS ADMIN capability; (c) if a security module is loaded, read and write access permissions to security attributes depend on a policy implemented by the security module; and (d) upon installing the package, a package manager copies the executable vendor metadata to the extended attributes of the file system; and wherein the package is hashed and then signed with a private certificate of a vendor of the executable, and integrity of the package is verified using a public certificate of the vendor to determine whether the package has been compromised.

9. A method of securing inter-process communication (IPC) based on trust, comprising:

providing a user quota mechanism to provide resource management of IPCs, wherein a single user is allowed to allocate a fixed amount of objects within a system maximum, the fixed amount being less than the system maximum; and providing a trusted IPC mechanism, embodied as computer executable instructions executed by a computer processor, to mediate access to IPC objects by employing signed executables signed by a key and containing a list of trusted keys, and using a trust relationship among a set of subjects connected to an IPC to determine whether communication can be carried out between processes, wherein in order for the processes to communicate via an IPC, either they have to trust each other, or a kernel must trust one process and that process must also trust the other process;

further comprising providing the trusted IPC mechanism in the form of a stackable security module, wherein if a first security module is loaded, stacking a second security module on top of it is possible, and permission checks must be passed for each module from bottom to top in order for permission finally to be granted; and wherein a topmost stackable security module calls a dummy hook function that enforces superuser semantics.

* * * * *

UNITED STATES PATENT AND TRADEMARK OFFICE
CERTIFICATE OF CORRECTION

| | |
|---|---|
| PATENT NO. | : 7,774,599 B2 |
| APPLICATION NO. | : 11/532159 |
| DATED | : August 10, 2010 |
| INVENTOR(S) | : Jinhong Guo et al. |

It is certified that error appears in the above-identified patent and that said Letters Patent is hereby corrected as shown below:

In column 28, line 67, claim 4, "CAP SYS ADMIN" should read -- CAP_SYS_ADMIN --

In column 29, line 31, claim 5, the word "to" should read -- top --

In column 31, line 3, claim 8, "CAP SYS ADMIN" should read -- CAP_SYS_ADMIN --

Signed and Sealed this

Seventh Day of December, 2010

David J. Kappos
*Director of the United States Patent and Trademark Office*